(12) United States Patent
Warrick et al.

(10) Patent No.: US 10,771,470 B2
(45) Date of Patent: *Sep. 8, 2020

(54) AUTOMATIC ROOM CHECK-IN UPON DETECTING DEVICE IDENTIFIER OF NEW GUEST ON NETWORK OF HOSPITALITY ESTABLISHMENT

(71) Applicant: Guest Tek Interactive Entertainment Ltd., Calgary (CA)

(72) Inventors: Peter S. Warrick, Calgary (CA); Joshua M. Wookey, Calgary (CA); David T. Ong, Calgary (CA); Ian S. McBeth, Calgary (CA); Darren T. Ziebart, Calgary (CA); Andrew T. MacMillan, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 102 days.

This patent is subject to a terminal disclaimer.

(21) Appl. No.: 16/027,662

(22) Filed: Jul. 5, 2018

(65) Prior Publication Data

US 2018/0367543 A1 Dec. 20, 2018

Related U.S. Application Data

(63) Continuation of application No. 14/833,112, filed on Aug. 23, 2015, now Pat. No. 10,044,724, which is a (Continued)

(30) Foreign Application Priority Data

May 8, 2012 (CA) ..................................... 2775782

(51) Int. Cl.
*H04L 29/06* (2006.01)
*G06F 16/951* (2019.01)
(Continued)

(52) U.S. Cl.
CPC .......... *H04L 63/102* (2013.01); *G06F 16/951* (2019.01); *G06F 16/955* (2019.01);
(Continued)

(58) Field of Classification Search
CPC ... H04L 63/102; H04L 63/02; H04L 63/0876; H04L 63/10; H04L 61/103;
(Continued)

(56) References Cited

U.S. PATENT DOCUMENTS 7,061,393 B2 6/2006 Buckingham et al.
9,130,934 B2 9/2015 Warrick et al.
(Continued)

FOREIGN PATENT DOCUMENTS

WO 2011005710 A2 1/2011
WO 2011005710 A3 3/2011

OTHER PUBLICATIONS

Stephani Lewis, iPASS Open Mobile Client, Nov. 20, 2009.
(Continued)

*Primary Examiner* — Kristine L Kincaid
*Assistant Examiner* — Alexander R Lapian
(74) *Attorney, Agent, or Firm* — ATMAC Patent Services Ltd.; Andrew T. MacMillan

(57) ABSTRACT

A service controller includes a network interface for coupling to a local area network of a hospitality establishment, and one or more processors coupled to the network interface. The one or more processors are configured to detect a device identifier of a user device on a local area network of a hospitality establishment, determine whether a guest of the hospitality establishment is associated with the device identifier, and automatically activate a service for the user device at the hospitality establishment in response to detecting the device identifier on the local area network when a guest of the hospitality establishment is determined to be associated with the device identifier.

20 Claims, 15 Drawing Sheets

Related U.S. Application Data continuation of application No. 13/874,515, filed on May 1, 2013, now Pat. No. 9,130,934.

(51) Int. Cl.
| | |
|---|---|
| *G06F 16/955* | (2019.01) |
| *H04L 29/12* | (2006.01) |
| *G06F 21/31* | (2013.01) |
| *G06Q 10/02* | (2012.01) |
| *G06Q 50/12* | (2012.01) |

(52) U.S. Cl.
CPC ............ *G06F 21/31* (2013.01); *G06Q 10/02* (2013.01); *G06Q 50/12* (2013.01); *H04L 61/103* (2013.01); *H04L 63/02* (2013.01); *H04L 63/0876* (2013.01); *H04L 63/10* (2013.01); *H04L 61/2015* (2013.01); *H04L 61/6022* (2013.01)

(58) Field of Classification Search
CPC ............ H04L 61/2015; H04L 61/6022; G06F 16/955; G06F 16/951; G06F 21/31; G06Q 10/02; G06Q 50/12
See application file for complete search history.

(56) References Cited

U.S. PATENT DOCUMENTS

| | | |
|---|---|---|
| 10,044,724 B2 | 8/2018 | Warrick et al. |
| 2002/0099665 A1 | 7/2002 | Burger et al. |
| 2004/0116115 A1 | 6/2004 | Ertel |
| 2005/0091539 A1 | 4/2005 | Wang et al. |
| 2005/0102529 A1 | 5/2005 | Buddhikot et al. |
| 2005/0246447 A1 | 11/2005 | Smidt et al. |
| 2005/0273848 A1 | 12/2005 | Charles et al. |
| 2007/0176739 A1 | 8/2007 | Raheman |
| 2008/0089277 A1 | 4/2008 | Alexander et al. |
| 2008/0271109 A1 | 10/2008 | Singh et al. |
| 2009/0025055 A1 | 1/2009 | White et al. |
| 2010/0115113 A1 | 5/2010 | Short et al. |
| 2010/0191551 A1 | 7/2010 | Drance et al. |
| 2011/0099598 A1 | 4/2011 | Shin et al. |
| 2011/0166995 A1* | 7/2011 | Fuerstenberg ........... G07C 9/29 705/40 |
| 2011/0314502 A1 | 12/2011 | Levy et al. |
| 2012/0005726 A1 | 1/2012 | Pitroda et al. |
| 2012/0011531 A1 | 1/2012 | Levy et al. |
| 2012/0011551 A1 | 1/2012 | Levy et al. |
| 2012/0208496 A1 | 8/2012 | Raleigh |
| 2012/0305339 A1 | 12/2012 | Korhonen et al. |
| 2013/0055358 A1 | 2/2013 | Short et al. |
| 2013/0172068 A1* | 2/2013 | Zhou et al. ............. G06F 15/63 463/16 |
| 2013/0332509 A1 | 12/2013 | Schwartz et al. |
| 2014/0002236 A1* | 1/2014 | Pineau ............... G07C 9/00309 340/5.6 |

OTHER PUBLICATIONS

Guest Tek Interactive Entertainment Ltd., Release Notes OneView Internet Version 6.2, Sep. 15, 2011.

Crestron Electronics Inc., Hospitality, Printed in USA; Doc. 4745A Jul. 2009.

\* cited by examiner

Set of authorized user devices 130

| Device ID | User ID | Zone Access Expiry | | | | | |
| --- | --- | --- | --- | --- | --- | --- | --- |
| | | Lobby | Conference room A | Conference room B | Guest rooms | Hotel corporate | |
| MAC-1 | User-A | - | - | - | - | - | ... |
| MAC-2 | User-B | 2011/10/11 16:32 | - | - | - | - | ... |
| MAC-3 | User-C | 2011/10/12 17:11 | 2011/10/11 17:11 | - | 2011/10/11 17:11 | - | ... |
| MAC-4 | User-C | 2011/10/12 17:11 | 2011/10/11 17:11 | - | 2011/10/11 17:11 | - | ... |
| MAC-5 | User-D | 2011/10/12 17:17 | - | 2011/10/11 17:17 | -- | - | ... |
| MAC-6 | User-E | 2011/10/12 17:44 | - | - | 2011/10/11 17:44 | - | ... |
| MAC-7 | User-F | 2011/10/18 00:01 | 2011/10/18 00:01 | 2011/10/18 00:01 | 2011/10/18 00:01 | 2011/10/18 00:01 | ... |
| ⋮ | ⋮ | ⋮ | ⋮ | ⋮ | ⋮ | ⋮ | |

FIG. 2

Guest database of hospitality establishment 136

| Room # | Currently registered user ID |
|---|---|
| 101 | User-B |
| 103 | User-E |
| 105 | User-D |
| 107 | User-A |
| 109 | - |
| 111 | User-E |
| 115 | User-G |
| ⋮ | ⋮ |

600 = Room #, 602 = Currently registered user ID

FIG. 6

Default HSIA service entitlements based on user type

132

700   702

| User type | Zone access time | | | | | |
|---|---|---|---|---|---|---|
| | Lobby | Conference room A | Conference room B | Guest rooms | Coffee shop | ... |
| Regular user | 48 hours | - | - | 24 hours | - | ... |
| VIP | 48 hours | 24 hours | 24 hours | 24 hours | 24 hours | ... |
| ⋮ | ⋮ | ⋮ | ⋮ | ⋮ | ⋮ | |

FIG. 7

Modify user profile settings for: Josh Wookey

User devices associated with this account:

| User device | MAC address (Device ID) | |
|---|---|---|
| Mobile phone | 00-E4-A1-32-C3-39 | Remove |
| Corporate netbook | 20-B0-D0-86-BB-F9 | Remove |
| Teleconferencing webcam | 71-FE-D0-26-A1-03 | Remove |

( Add new device )

Loyalty program membership numbers associated with this account:

| Hospitality establishment (Site ID) | Loyalty program # (User ID) | User type (Access entitlement) | |
|---|---|---|---|
| Galactic Hotel (4) | 122-32-2345 | Regular | Remove |
| Centennial Airlines (35) | ABF334401 | Regular | Remove |
| Beaches Resort (135) | 5E3DA7 | VIP | Remove |
| Waterfront park (139) | 4391 | Regular | Remove |
| Terminal bus lines (144) | 2010-01-01-39 | Regular (upgrade) | Remove |

( Add new location )

( Save )  ( Cancel )

FIG. 9

Event-specific network settings

General settings

| | |
|---|---|
| Event ID | 3421 |
| Description | Medical conference |
| Start time | 2011/11/02 10:00 [Adjust] |
| End time | 2011/11/02 21:00 [Adjust] |
| Location(s) | 1. Meeting room A [Remove]<br>2. Meeting room B [Remove]<br>3. Meeting room C [Remove]<br>[Add new room] |
| SSID | "Medical_peer_conference" |
| Require login | ● Yes  ○ No |
| Login portal | http://login23.globalsuite.com |
| Meeting passcode | M783A |
| Walled garden site(s) | http://hotelhomepage.example.com<br>http://reservations.example.com |
| Bandwidth limits (Mbit/s) | Cap 30   Rate 10 |
| User isolation | ● Yes  ○ No |
| Required # of public IP(s) | 1 |

Registered device settings

| Device name | MAC address | Auto login | User shared | Mbit/s Cap | limits Rate | Public IP |
|---|---|---|---|---|---|---|
| Printer | 00:08:C7:1B:8C:02 | ☐ | ☒ | | | |
| Cam | 09:A1:47:12:EF:31 | ☒ | ☐ | 5 | 5 | 69.46.103.131 |

[Add new device]

[Save] [Cancel]

FIG. 13

AUTOMATIC ROOM CHECK-IN UPON DETECTING DEVICE IDENTIFIER OF NEW GUEST ON NETWORK OF HOSPITALITY ESTABLISHMENT

CROSS-REFERENCE TO RELATED APPLICATIONS

This application is a continuation of U.S. patent application Ser. No. 14/833,112 filed Aug. 23, 2015, which is a continuation of U.S. patent application Ser. No. 13/874,515 filed May 1, 2013, which claims the benefit of Canadian Patent Application No. 2,775,782 filed May 8, 2012. All of these applications are incorporated herein by reference.

BACKGROUND OF THE INVENTION

Field of the Invention

The invention pertains generally to activating services for guests at hospitality establishments. More specifically, the invention relates to automatically checking in a new guest in response to detecting a user device associated with the new guest on a computer network of the hospitality establishment.

Description of the Related Art

Hospitality establishments such as hotels and resorts typically provide high speed Internet access (HSIA) to guests. Often a hospitality establishment desires to provide guests with HSIA using a computer network installed on the premises but does not wish to design or support the network. In this situation, the hospitality establishment may contract an external vendor to provide an HSIA solution.

An example of a vendor-provided HSIA solution is the One View Internet™ (OVI) system by Guest-Tek™. To begin an HSIA session at a hotel employing the OVI system, a guest connects a user device to the hotel's computer network, either through a physical cable such as Ethernet or a wireless connection such as WiFi™, and opens a web browser to access a website on the Internet. Instead of allowing user devices immediate access to the Internet, the OVI system acts as a captive portal and requires the guest to first log in at a predetermined login portal. To this end, a firewall controlling access between the local area network (LAN) of the hotel and the Internet includes a default rule that causes unauthorized user devices to display the login portal in the web browser.

At the login portal the guest signs up for Internet access. When the guest is an attendee of an event being held at the hotel such as a meeting or conference, the guest enters a meeting passcode known only to attendees of the event in order to sign in. The OVI system checks the meeting passcode entered by the user to determine whether it matches that of an active event currently being held at the hospitality establishment. When the guest is an individual staying at the hotel, the guest enters their room number and other personal details, selects a desired bandwidth level and other options such as access duration etc., provides payment information, and performs other actions such as agreeing to terms and conditions. The OVI system only authorizes the user device to access the Internet after the guest has successfully completed the login process at the login portal.

To authorize a particular user device for HSIA after the login process has been completed, the OVI system adds a device-specific rule to the firewall that allows data to flow between the Internet and the unique media access control (MAC) address of the particular user device. In this way, only user devices from which guests of the hotel have properly logged in at the login portal are provided HSIA.

However, some user devices brought to hotels are unable to be logged in at a web-based login portal because the devices either do not include web browsing technology or do not permit the guest to access the login portal.

Examples of user devices that do not include web browsing technology include standalone teleconferencing webcam appliances, routers, Internet Protocol (IP) telephones, and other IP-enabled devices that lack a user interface capable of displaying the login portal or allowing the guest to enter the required login information. Because these devices are not capable of utilizing the web-based login portal, they cannot be logged in and do not gain Internet connectivity at the hotel.

Examples of user devices that do not permit the guest to access the login portal include locked-down corporate and military laptops and equipment that is configured to only connect with a designated destination such as a fixed server address accessed via a company or military virtual private network (VPN). Although these devices may include web browsers that are technically capable of displaying a login portal, due to security concerns, the device may be configured to actively ignore or block any attempts to cause the device to display the hotel's login portal. Typically the users of such devices have no administrator rights to modify or override these security settings. Therefore, these devices also cannot be logged in at the login portal and do not gain Internet connectivity at the hotel.

When a guest is unable to log in from a particular user device at the login portal such as in the above-described situations, the guest needs to contact support staff to request that the user device be manually cleared through the hotel's firewall in order to receive HSIA. Often the guest will not realize that manual intervention by support staff is required and may waste significant time attempting to troubleshoot the lack of Internet connectivity on their own. When the guest finally does call technical support for assistance, the guest may not be ready to provide support staff with the device's unique MAC address, which is required in order to manually add a device-specific exception allowing Internet access to the firewall. Helping the guest determine their device's unique MAC address delays call center staff in resolving the problem and moving onto a next support call.

Manual adjustment of firewall rules by support staff in order to give certain user devices Internet access both increases the support costs of the hospitality establishment's HSIA system and negatively impacts the guest experience. It would be desirable to be able to automatically activate the HSIA service for these devices.

iPass Incorporated offers the iPass Open Mobile Client™ that when installed on a user device automatically logs in the user device upon arrival at an iPass-enabled hotspot or Internet access provider such as a hotel. However, in order for the iPass Open Mobile Client to automatically log in a new user for Internet access, the user (or the user's employer in the case of a corporate device) must have previously signed up for an iPass account and purchased an amount of Internet access in advance. The user must also have previously installed and configured the iPass Open Mobile Client software on their device, which may not be possible for devices unsupported by iPass's client software or for which the user does not have sufficient access rights to install software (e.g., a locked-down corporate/military devices).

International Patent Publication No. WO2011005710 A2 discloses a system that allows zones and migration rules between the zones to be configured within a hotel. When a rule is configured to allow migration from a first zone to a second zone, guests already logged into the first zone may migrate to the second zone without being forced to re-log in. However, this system still requires the user to first log in and gain access to an initial zone upon arrival at the hotel. Only after the user has logged in from the initial zone will the system allow the user to migrate to certain other zones in the hotel without being required to re-log in.

BRIEF SUMMARY OF THE INVENTION

According to an exemplary embodiment of the invention, a high speed Internet access (HSIA) service at a hospitality establishment such as a hotel is automatically activated for a particular guest's user device upon detecting the device identifier of the user device on the local area network of the hospitality establishment. An advantage of this embodiment is the guest may immediately access the Internet from the user device upon arrival at the hospitality establishment without requiring the guest to first log in at a login portal from the user device or preinstall special client software.

According to another exemplary embodiment of the invention a service for a particular guest of a hospitality establishment is automatically activated in response to detecting on a local area network of the hospitality establishment a user device having a device identifier associated with the particular guest.

According to another exemplary embodiment of the invention there is disclosed a method including detecting a device identifier of a user device on a local area network of a hospitality establishment and determining whether a guest of the hospitality establishment is associated with the device identifier. The method further includes automatically activating a service for the user device at the hospitality establishment in response to detecting the device identifier on the local area network when a guest of the hospitality establishment is determined to be associated with the device identifier.

According to another exemplary embodiment of the invention there is disclosed a tangible computer-readable medium comprising computer executable instructions that when executed by a computer cause the computer to perform the above method.

According to another exemplary embodiment of the invention there is disclosed a service controller including a network interface for coupling to a local area network of a hospitality establishment, and one or more processors coupled to the network interface. The one or more processors are configured to detect a device identifier of a user device on the local area network of the hospitality establishment, determine whether a guest of the hospitality establishment is associated with the device identifier; and automatically activate a service for the user device at the hospitality establishment in response to detecting the device identifier on the local area network when a guest of the hospitality establishment is determined to be associated with the device identifier.

According to another exemplary embodiment of the invention there is disclosed an apparatus comprising means for detecting a device identifier of a user device on a local area network of a hospitality establishment, means for determining whether a guest of the hospitality establishment is associated with the device identifier, and means for automatically activating a service for the user device at the hospitality establishment in response to detecting the device identifier on the local area network when a guest of the hospitality establishment is determined to be associated with the device identifier.

According to another exemplary embodiment of the invention there is disclosed a system including a service controller for detecting a device identifier of a user device on a local area network of a hospitality establishment, and at least one database queried by the service controller to determine whether a guest of the hospitality establishment is associated with the device identifier. The service controller automatically activates a service for the user device at the hospitality establishment in response to detecting the device identifier on the local area network when a guest of the hospitality establishment is determined to be associated with the device identifier.

According to another exemplary embodiment of the invention there is disclosed a method including detecting a device identifier of a user device in network traffic transmitted on a local area network of a hospitality establishment; determining that a service available at the hospitality establishment is not already activated for the user device; querying a reservation database of the hospitality establishment to determine whether the detected device identifier matches a registered user device associated with an active reservation of the hospitality establishment, wherein reservations of the hospitality establishment stored in the reservation database may each be associated with one or more registered user devices and are determined active according to their respective start and end times in comparison with current time; and automatically activating the service for the user device when the detected device identifier matches at least one registered user device associated with at least one active reservation of the hospitality establishment.

According to another exemplary embodiment of the invention there is disclosed a method including detecting a device identifier of a user device in network traffic transmitted on a local area network of a hospitality establishment; determining that a service available at the hospitality establishment is not already activated for the user device; querying a user profile database to find a particular user identifier that is associated with the detected device identifier, wherein the user profile database stores associations between one or more device identifiers and one or more user identifiers; querying a guest database of the hospitality establishment to determine whether the particular user identifier is associated with a current guest of the hospitality establishment, wherein the guest database of the hospitality establishment stores user identifiers of currently registered guests of the hospitality establishment; and automatically activating the service for the user device when the particular user identifier is associated with at least one current guest of the hospitality establishment.

According to another exemplary embodiment of the invention there is disclosed a service controller including a network interface for coupling to a local area network of a hospitality establishment; and one or more processors coupled to the network interface. The one or more processors are configured to detect a device identifier of a user device in network traffic transmitted on the local area network; determine that a service available at the hospitality establishment is not already activated for the user device; query a reservation database of the hospitality establishment to determine whether the detected device identifier matches a registered user device associated with an active reservation of the hospitality establishment, wherein reservations of the hospitality establishment stored in the reservation database may each be associated with one or more registered user devices and are determined active according to their respective start and end times in comparison with current time; and automatically activate the service for the user device when the detected device identifier matches at least one registered user device associated with at least one active reservation of the hospitality establishment.

According to another exemplary embodiment of the invention there is disclosed a service controller including a network interface for coupling to a local area network of a hospitality establishment; and one or more processors coupled to the network interface. The one or more processors are configured to detect a device identifier of a user device in network traffic transmitted on a local area network of the hospitality establishment; determine that a service available at the hospitality establishment is not already activated for the user device; query a user profile database to find a particular user identifier that is associated with the detected device identifier, wherein the user profile database stores associations between one or more device identifiers and one or more user identifiers; query a guest database of the hospitality establishment to determine whether the particular user identifier is associated with a current guest of the hospitality establishment, wherein the guest database of the hospitality establishment stores user identifiers of currently registered guests of the hospitality establishment; and automatically activate the service for the user device when the particular user identifier is associated with at least one current guest of the hospitality establishment.

According to another exemplary embodiment of the invention there is disclosed a system including a reservation database storing reservations of a hospitality establishment, wherein reservations of the hospitality establishment stored in the reservation database may each be associated with one or more registered user devices and are determined active according to their respective start and end times in comparison with current time; and a service controller coupled to the reservation database. The service controller is operable to detect a device identifier of a user device in network traffic transmitted on a local area network of the hospitality establishment; determine that a service available at the hospitality establishment is not already activated for the user device; query the reservation database to determine whether the detected device identifier matches a registered user device associated with an active reservation of the hospitality establishment; and automatically activate the service for the user device when the detected device identifier matches at least one registered user device associated with at least one active reservation of the hospitality establishment.

According to another exemplary embodiment of the invention there is disclosed a system including a user profile database storing associations between one or more device identifiers and one or more user identifiers; a guest database of a hospitality establishment storing user identifiers of currently registered guests of the hospitality establishment; and a service controller coupled to the user profile database, the guest database, and a local area network of the hospitality establishment. The service controller operable to detect a device identifier of a user device in network traffic transmitted on the local area network of the hospitality establishment; determine that a service available at the hospitality establishment is not already activated for the user device; query the user profile database to find a particular user identifier that is associated with the detected device identifier; query the guest database to determine whether the particular user identifier is associated with a current guest of the hospitality establishment; and automatically activate the service for the user device when the particular user identifier is associated with at least one current guest of the hospitality establishment.

According to another exemplary embodiment of the invention there is disclosed an apparatus for controlling automatic check-in at a hospitality establishment. The apparatus includes a storage device, a network interface for coupling to a computer network of the hospitality establishment, and one or more processors coupled to the storage device and the network interface. By the one or more processors executing a plurality of software instructions loaded from the storage device, the one or more processors are configured to detect a device identifier of a user device in network traffic transmitted on the computer network of the hospitality establishment and query one or more databases of the hospitality establishment to determine whether the device identifier is associated with a new guest registered for a particular room of the hospitality establishment. The one or more processors are further configured to send a room access key to the user device via the computer network in response to determining that the device identifier is associated with the new guest registered for the particular room. The room access key allows the new guest registered for the particular room to open a door lock of the particular room.

According to another exemplary embodiment of the invention there is disclosed a method of automatic check-in at a hospitality establishment. The method includes detecting a device identifier of a user device in network traffic transmitted on a computer network of the hospitality establishment and querying one or more databases of the hospitality establishment to determine whether the device identifier is associated with a new guest registered for a particular room of the hospitality establishment. The method further includes sending a room access key to the user device via the computer network in response to determining that the device identifier is associated with the new guest registered for the particular room. The room access key allows the new guest registered for the particular room to open a door lock of the particular room.

According to another exemplary embodiment of the invention there is disclosed a non-transitory processor-readable medium comprising a plurality of processor-executable instructions that when executed by one or more processors cause the one or more processors to perform steps of detecting a device identifier of a user device in network traffic transmitted on a computer network of a hospitality establishment and querying one or more databases of the hospitality establishment to determine whether the device identifier is associated with a new guest registered for a particular room of the hospitality establishment. The steps further include sending a room access key to the user device via the computer network in response to determining that the device identifier is associated with the new guest registered for the particular room. The room access key allows the new guest registered for the particular room to open a door lock of the particular room.

These and other embodiments and advantages of the invention will become apparent from the following detailed description, taken in conjunction with the accompanying drawings, illustrating by way of example the principles of the invention.

BRIEF DESCRIPTION OF THE DRAWINGS

The invention will be described in greater detail with reference to the accompanying drawings which represent preferred embodiments thereof, wherein:

FIG. 2 shows an example set of authorized user devices stored in the data storage device of FIG. 1.

FIG. 6 shows an exemplary guest database of the hotel of FIG. 1.

FIG. 7 shows an example of the default HSIA service entitlements of FIG. 1 based on a user type.

FIG. 9 illustrates a user interface (UI) screen provided by the UI module of FIG. 1 allowing modification of information stored in the user profile database for an exemplary user.

FIG. 13 illustrates a UI screen allowing an event organizer to adjust a set of event-specific network settings for a particular event as stored in a reservation database such as the guest database of FIG. 1.

DETAILED DESCRIPTION

Figure 1:
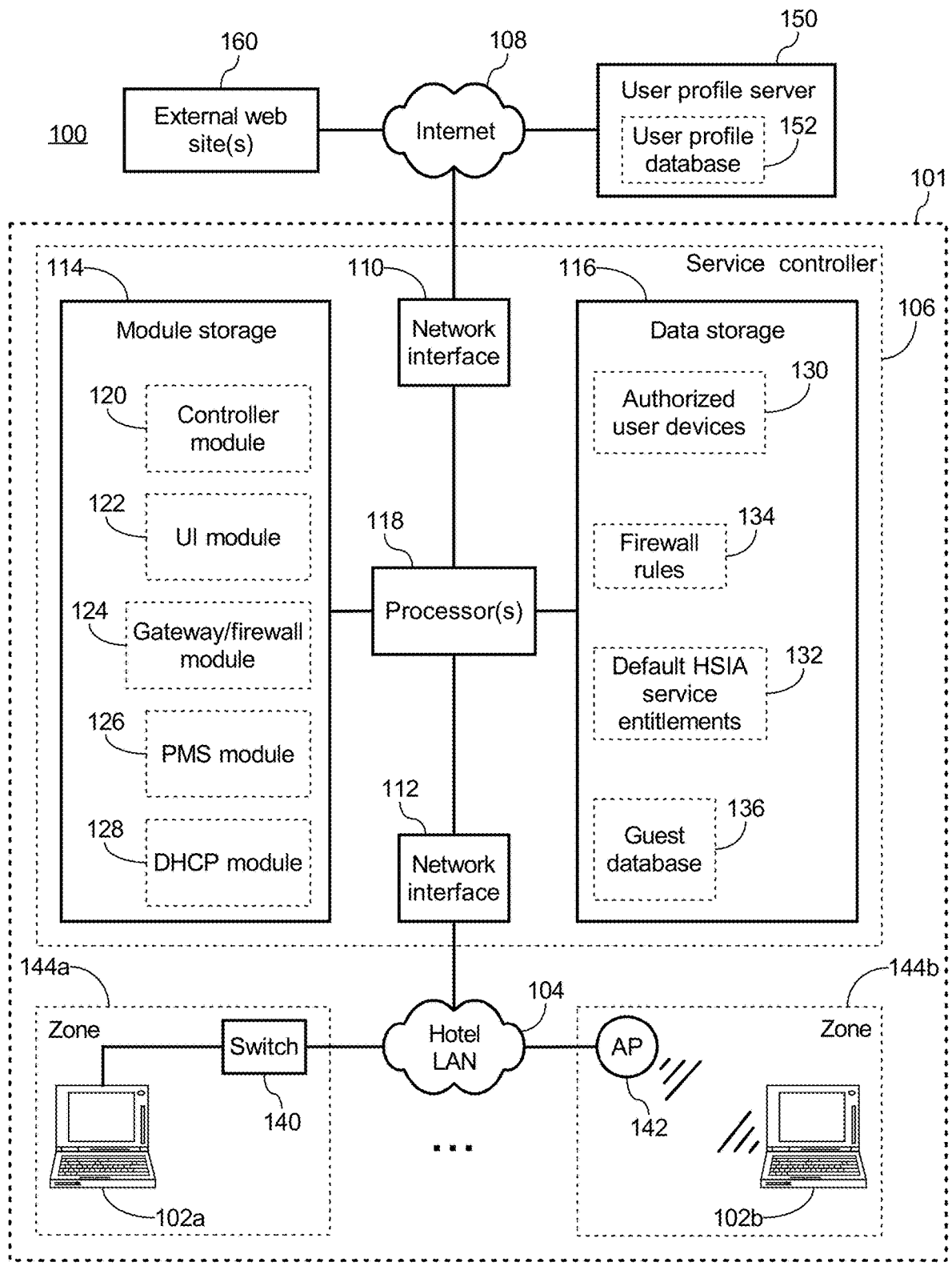
FIG. 1 shows a block diagram of a system for automatic service activation at a hospitality establishment according to an exemplary embodiment of the invention.

FIG. 1 shows a block diagram of a system 100 for automatic service activation at a hospitality establishment according to an exemplary embodiment of the invention. In this embodiment, the hospitality establishment is a hotel 101 and the system 100 automatically activates a high speed Internet access (HSIA) service for certain user devices 102 in response to detecting the media access controller (MAC) addresses of the user devices 102 on the hotel's LAN 104.

As shown in FIG. 1, a service controller 106 is coupled between the hotel's LAN 104 and the Internet 108. The service controller 106 in this embodiment is a computer server including a first network interface 110 coupled to the Internet 108 and a second network interface 112 coupled to the hotel's LAN 104. The service controller 106 further includes a module storage device 114 and a data storage device 116, and each of the network interfaces 110, 112 and storage devices 114, 116 are coupled to one or more processors 118. In the following description, the plural form of the word "processors" will be utilized as it is common for a central processing unit (CPU) of a computer server to have multiple processors (sometimes also referred to as cores); however, it is to be understood that a single processor may also be configured to perform the below-described functionality in other implementations.

The service controller 106 in this embodiment integrates and performs a variety of functions at the hotel 101. To allow the service controller 106 to perform these functions, the module storage device 114 stores a number of software modules for execution by the processors 118, including a controller module 120, a user interface (UI) module 122, a gateway/firewall module 124, a property management system (PMS) module 126, and a dynamic host control protocol (DHCP) module 128.

Briefly described, the controller module 120 controls the automatic activation of services for particular user devices 102 at the hotel 101. The UI module 122 acts as a web server, allowing both guests and staff at the hotel 101 to receive information from, and in some cases interact with, the service controller 106. The gateway/firewall module 124 controls network traffic passed between the Internet 108 and the hotel LAN 104. The PMS module 126 manages property-specific details of the hotel 101 such as guest and event reservations, and room assignments. The DHCP module 128 assigns dynamic Internet Protocol (IP) addresses to user devices 102 as they are connected to the hotel's LAN 104.

The data storage device 116 stores data utilized by the processors 118 when performing the functions of the various modules 120, 122, 124, 126, 128. In this example, the data storage device 116 stores a set of authorized user devices 130 indicating to the controller module 120 the particular user devices 102 for which the HSIA service has already been activated. A set of firewall rules 134 causes the gateway/firewall module 124 to prevent Internet access for unauthorized user devices 102 according to a default rule, and includes a device-specific exception to the default rule (i.e., one or more device-specific rules) allowing Internet access for each of the specific user devices 102 included on the set of authorized user devices 130. A set of default HSIA service entitlements 132 are utilized by the controller module 120 when automatically activating the HSIA service for a particular user device 102. Finally, the guest database 136 stores details of the current guests, events, and room assignments of the hotel 101 for use by the PMS module 126. In this embodiment, a relational database is utilized to store the guest database 136; however, the term "database" as utilized in this description is meant to refer to any stored collection of organized data.

A first user device 102a is shown coupled to the hotel LAN 104 via switch 140 and a second user device 102b is shown coupled to the hotel LAN 104 via an access point (AP) 142. Additionally, the hotel 101 is divided into a number of zones 144 representing different physical areas of the hotel 101 and logical partitions of the LAN 104 in this embodiment. In particular, each of the first and second zones 144a,b illustrated in FIG. 1 represent different physical areas such a lobby area, conference room area, guest room area, etc, and non-physical divisions such as a virtual local area network (VLAN) reserved for employees of the hotel 101.

In the following description, the hotel 101 will be assumed to have the following five zones 144: a lobby zone, a first conference room zone, a second conference room zone, a guest rooms zone including all the guest rooms in the hotel 101, and a corporate zone being limited to only employees of the hotel. Separate points of connection to the hotel LAN 104 such as switches 140 and APs 142 may be employed for each zone 144 in some embodiments.

As illustrated in FIG. 1, a user profile server 150 providing a user profile database 152 is coupled to the hotel 101 via the Internet 108. The user profile database 152 stores a plurality of user profiles, each user profile associating one or more user identifiers such as loyalty program member identifiers with one or more user device identifiers such MAC addresses. As will be explained in more detail, the user profile server 150 may further be coupled via the Internet 108 to a number of different hospitality establishments such as other hotels and resorts (not shown).

Various external web sites 160 are also shown coupled to the Internet 108 in FIG. 1. These external web sites 160 correspond to various web servers on the Internet 108 that may be accessed by a user device 102 at the hotel 101 after the HSIA service is activated for that user device 102.

With respect to the HSIA service at the hotel 101, the set of authorized user devices 130 stored in the data storage device 116 specifies details of each user device 102 for which the HSIA service is currently activated at the hotel 101. An example set of authorized user devices 130 is illustrated in FIG. 2.

The set of authorized user devices 130 is utilized by the controller module 120 to both determine whether the HSIA service has already been activated for a newly connected user device 102, and to trigger an update of the firewall rules 134 when the HSIA service is to be automatically activated for a new user device 102 or is to be deactivated for an existing user device 102 when the user's access entitlement for at least one zone 144 expires.

In this example, the set of authorized user devices 130 is stored as a database table having information for each individual user device 102 stored in rows. For each user device 102, a device identifier column 200 stores the unique MAC address of the user device, a user identifier column 202 stores a loyalty program membership identifier associated with the MAC address as retrieved from the user profile database 152, and a plurality of zone access expiry columns 204 store the expiry times for this user device 102 in each of the various zones 144 available at the hotel 101.

Taking the "MAC-2" user device 102 as an example, the HSIA service is activated only from the hotel's lobby zone 144, and the HSIA service in the lobby zone 144 for the "MAC-2" user device 102 will expire at "2011/10/11 16:32".

In this way, each user device 102 as tracked by a device identifier such as a unique MAC address may be authorized to access the Internet 108 from a plurality of zones 144 within the hotel. Furthermore, access entitlements from each zone are specific to each individual user device 102. Having zone-specific access times for each user device 102 is beneficial to allowed recent guests who are now checked out of their rooms to lose access from the guest rooms zone 144 while still retaining another X hours of access from the hotel lobby zone 144, for example.

Figure 3:
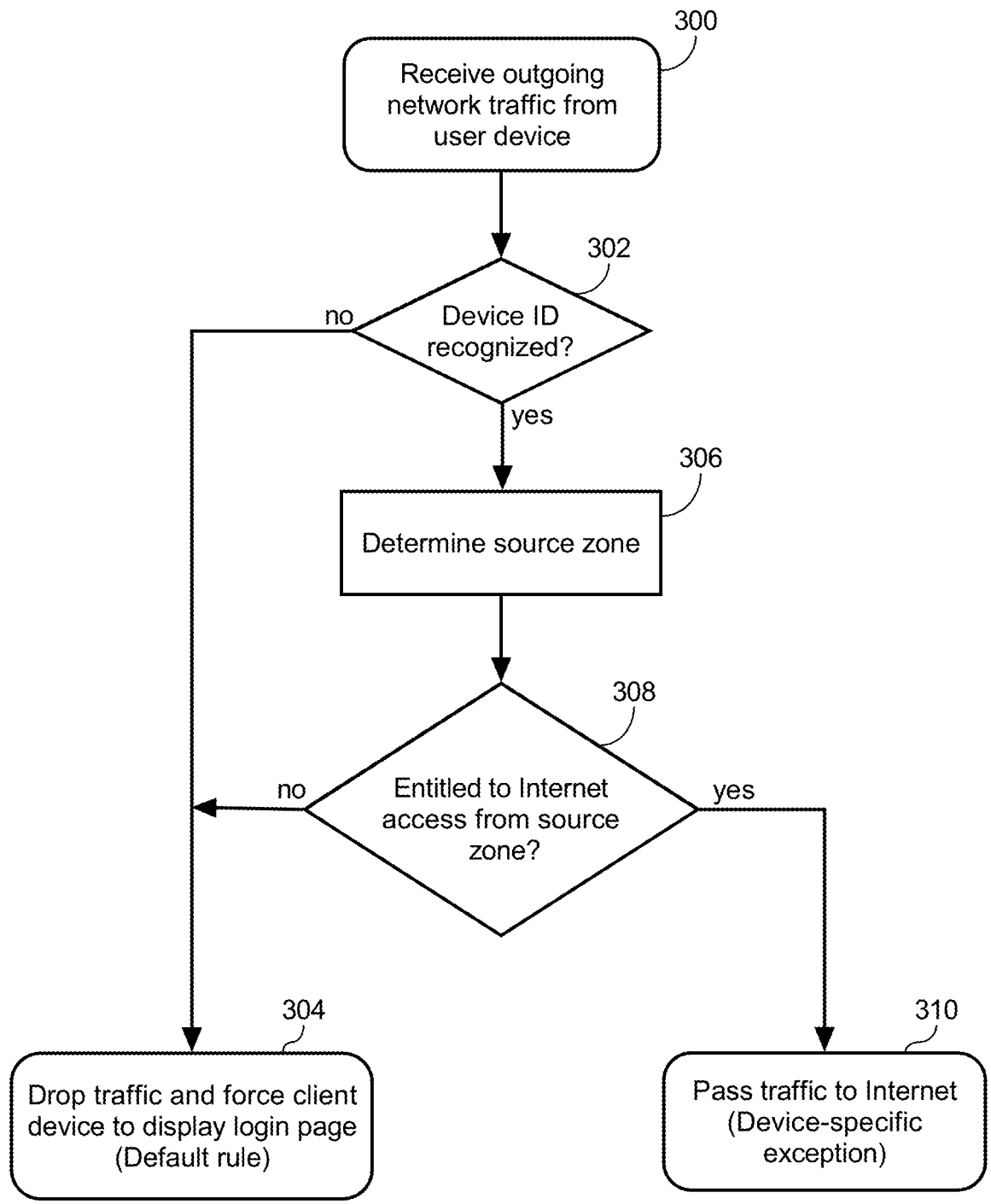
FIG. 3 illustrates a flowchart showing the functionality of the gateway/firewall module of FIG. 1 resulting from the firewall rules according to an exemplary embodiment of the invention.

FIG. 3 illustrates a flowchart showing the functionality of the gateway/firewall module 124 resulting from the firewall rules 134 in this embodiment. The gateway/firewall module 124 couples the hotel LAN 104 to the Internet 108 and acts to control the flow of data between these two networks 104, 108. The gateway/firewall module 124 may also include other functionality such as network address translation (NAT), redirection server, and/or proxy server functionality; or the gateway/firewall module 124 may be replaced with or installed in addition to one or more servers implementing these functions according to application-specific requirements. In the following description, the terms "gateway" and "firewall" will be utilized to collectively refer to devices that perform access control between different networks.

The firewall rules 134 in this embodiment include a default rule (generally corresponding to step 304 of FIG. 3) that prevents unauthorized user devices 102 from accessing the Internet 108. Unauthorized user devices 102 in this embodiment refers to both unrecognized user devices 102 having device identifiers (e.g., MAC addresses) that are not included on the set of authorized user devices 130 shown in FIG. 2, and user devices 102 having device identifiers that are included on the set of authorized user devices but have passed the limits of the zone access expiry times 204 or are not entitled to access from the determined source zone.

In order to activate the HSIA service for each of the user devices 102 that are included on the set of authorized user devices 130, the firewall rules 134 are updated to include device-specific exceptions to the default rule that authorize access to the Internet 108 from specific zones 144. Device-specific exceptions generally correspond to step 310 in FIG. 3. When a change is made to the set of authorized user devices 130 illustrated in FIG. 3, the processors 118 execute the controller module 120 in order to update the firewall rules 134 accordingly to reflect the change. Likewise, when the current time passes an expiry time in one of the zone access expiry columns 204, the controller module 124 automatically updates the firewall rules to remove the corresponding device-specific rules and thereby de-authorize the affected user device(s) 102 from Internet access from the expired zones 144. After the firewall rules 134 are updated, the results of the device-specific checks at steps 302 and 308 may have different outcomes on a next occurrence of outgoing network traffic.

The steps of the flowchart of FIG. 3 are not restricted to the exact order shown, and, in other embodiments, shown steps may be omitted or other intermediate steps added. In this embodiment the processors 118 execute the gateway/firewall module 124 in order to cause the service controller 106 to perform the following illustrated steps.

At step 300, the gateway/firewall module 124 receives outgoing network traffic from a user device 102. For example, the outgoing network traffic may be a request by a user device 102 at the hotel 101 to establish a connection with an IP address corresponding to an external website 160 on the Internet 108. To ensure the gateway/firewall module 124 receives all outgoing network traffic at this step, the service controller 106 may be set as the default gateway for the user device 102 during a DHCP process previously performed by the DHCP module 128 (e.g., performed upon connection of the user device 102 to the hotel LAN 104).

At step 302, the gateway/firewall module 124 determines whether or not the device ID of the user device 102 (e.g., the device's MAC address in this embodiment) is recognized. The MAC address is deemed recognized when it is listed on the set of authorized user devices 130 and/or has one or more corresponding device-specific exceptions included in the firewall rules 134. When the MAC address is recognized, control proceeds to step 306; otherwise, the user device 102 that sent the network traffic received at step 300 is deemed unauthorized and control proceeds to the default rule at step 304.

At step 304, the gateway/firewall module 124 by default drops the outgoing network traffic in order to prevent unauthorized user devices 102 from accessing the Internet 108. In a preferred embodiment, the gateway/firewall module 124 further forces the unauthorized user device 102 to display a predetermined login portal of the hotel 101.

Hypertext transfer protocol (HTTP) redirection techniques may be utilized at this step to redirect the user device's web browser to the address of the login portal rather than that of the user's desired external web site 160. Additionally, U.S. patent application Ser. No. 13/402,198 naming common inventor David Ong and filed Feb. 22, 2012 describes techniques of causing a user device 102 to display a predetermined login portal without requiring a browser redirection message.

At step 306, the gateway/firewall module 124 determines the source zone 144 from which the network traffic originated in order to determine where in the hotel 101 the user device 102 is currently located. In a preferred embodiment, this step is passively performed while checking the access entitlements at step 308 because the network traffic received at step 300 already identifies the source zone. For example, in one implementation virtual local area network (VLAN) tags are utilized to specify the source zone 144 from which network traffic originated. Specifically, the switches 140 in a first zone 144*a* place network traffic on a VLAN corresponding to the first zone 144*a*, and the APs 142 in a second zone 144*b* place network traffic on a different VLAN corresponding to the second zone 144*b*. Therefore, the gateway/firewall module 124 can determine the source zone by mapping the VLAN tag of the network traffic received at step 300 to its corresponding zone 144.

In another implementation, the DHCP module 128 on the hotel LAN 104 assigns IP addresses to user devices 102 according to predetermined address ranges corresponding to different zones 144. For example, devices that connect to the first zone 144*a* receive an IP address in a first range while devices 102 that connect to the second zone 144*a* receive an IP address in another, different range. Therefore, the gateway/firewall module 124 can determine the source zone by mapping the source IP address of the network traffic received at step 300 to its corresponding zone 144.

Determining the source zone passively such as utilizing VLAN tag or IP address is beneficial because this may be done as a part of checking to see if the received network traffic matches one of firewall rules 134. No explicit determination of source zone is required thereby simplifying the functionality of the gateway/firewall 134.

In other embodiments, determining the source zone may be done actively at step 306 such as by tracing back through the hotel LAN 104 using simple network management protocol (SNMP) messages in order to determine the source switch/port combination from which the packets with the MAC address of the user device 102 was originally received. By looking up this source switch/port combination on a switch-port-to-zone mapping table, the source zone can be determined. In another example, each AP 142 in the hotel 101 may be within range of only a single zone such as when each guest room of the hotel 101 has its own AP 142. Therefore, by determining the originating AP 142, the service controller 106 can determine the source zone at which the user device 102 is currently located. In yet another example, the zones 144 may correspond to different SSIDs; therefore, by determining the SSID to which the user device 102 is associated the service the service controller 106 can determine the source zone at which the user device 102 is currently located.

Combinations of the above-described techniques may be utilized to determine the source zone in other embodiments.

At step 308, the gateway/firewall module 124 determines whether network traffic from this MAC address is allowed to be passed to the Internet 108 from the source zone 144. Assuming zones are indicated with VLAN tags and taking the user device 102 having "MAC-5" as its MAC address in column 200 of FIG. 2 as an example, there may be two device-specific exceptions in the firewall rules 134: a first exception entitling the "MAC-5" user device 102 to access the Internet 108 when the VLAN tag corresponds to the "Lobby" zone 144, and a second exception entitling the "MAC-5" user device 102 to access the Internet 108 when the VLAN tag of the received network traffic correspond to the "Conference room B" zone 144. Therefore, when the network traffic received at step 300 matches either of these two rules, control proceeds to step 310. Alternatively, when the network traffic received at step 300 is from the "MAC-5" user device 102 but the VLAN tag corresponds to another source zone 144 other than "Lobby" or "Conference room B", the user device 102 is deemed unauthorized and control proceeds to the default rule at step 304.

At step 310, the gateway/firewall module 124 passes the network traffic received at step 300 to the Internet 108. This step may be performed by the processors 118 transmitting the network traffic packets on the Internet 108 via the first network interface 110.

Although not illustrated, the gateway/firewall module 124 may also perform control functions for incoming network traffic from the Internet 108 to the hotel LAN 104. In a preferred embodiment, the gateway/firewall module 124 only allows traffic to pass from the Internet 108 to the hotel LAN 104 for connections that are already opened as initiated by a user device 102 on the hotel LAN 104. However, other control functions for incoming network traffic may be employed in other configurations according to application specific requirements. For example, certain user devices 102 may be authorized to act as servers and therefore be able to receive connection requests initiated by devices on the Internet 108.

Figure 4:
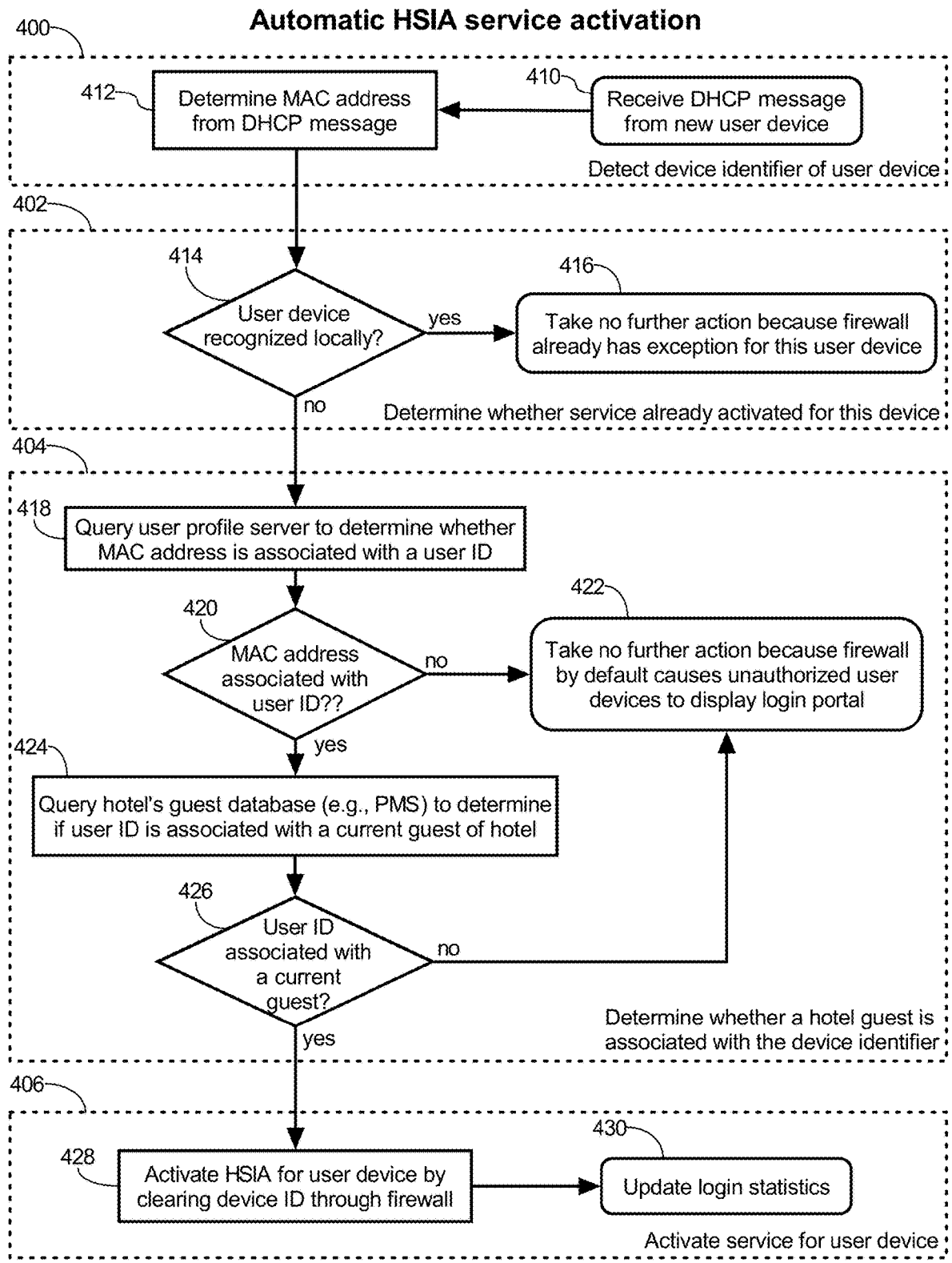
FIG. 4 illustrates a flowchart describing how the service controller of FIG. 1 automatically activates a service for a user device at a hospitality establishment according to an exemplary embodiment of the invention.

FIG. 4 illustrates a flowchart describing how the service controller 106 automatically activates a service for a user device 102 at a hospitality establishment according to an exemplary embodiment of the invention. The steps of the flowchart are not restricted to the exact order shown, and, in other embodiments, shown steps may be omitted or other intermediate steps added. In this embodiment, the processors 118 execute the controller module 120 in order to cause the service controller 106 to perform the following top-level steps:

Step 400: Detect a device identifier of a user device 102 on the hotel LAN 104.

Step 402: Determine whether the service in question has already been activated for this user device 102.

Step 404: When the service has not already been activated for this user device, determine whether a guest of the hotel 101 is associated with the device identifier.

Step 406: In response to determining that a guest of the hotel 101 is associated with the device identifier, automatically activate the service for the user device 102.

As illustrated in FIG. 4, in an advantageous application of this embodiment of the invention the device identifier is the MAC address of the user device 102 and the service in question is the HSIA service at the hotel 101.

At step 410, the controller module 120 monitors network traffic on the hotel LAN 104 for DHCP messages, for example, DHCP discover/offer/request/acknowledgement etc., that are transmitted after a new user device 102 is first connected. Typical user devices 102 will utilize DHCP to configure themselves for the hotel LAN 104 upon connection (either wired or wireless) by immediately broadcasting DHCP messages. The DHCP module 128 (or another DHCP server on the hotel LAN 104) responds to the newly connected user device 102 with various information such an IP address for use by the user device 102, a default gateway IP address for use by the user device 102 when sending network traffic to destinations off a local subnet, and a netmask setting allowing the user device 102 to determine which destination addresses are off the local subnet. Regardless of whether the DHCP module 128 (or another DHCP server) is located within or external to the service controller 106, because the DHCP messages are broadcast on the hotel LAN 104, the controller module 120 is able to receive the DHCP messages.

At step 412, the controller module 120 determines the MAC address of the newly connected user device 102 from the received DHCP messages. For example, the field "CHADDR" (Client Hardware Address) in the DHCP message received at step 410 indicates the MAC address of the newly connected user device 102.

At step 414, the controller module 120 checks the set of authorized user devices 130 and/or the firewall rules 134 stored in the data storage device 116 to determine whether the newly connected user device 102 is already recognized locally. When a user device 102 is recognized locally, the user device's MAC address will be listed on the set of authorized user devices 130 and the firewall rules 134 stored in the data storage device 116. When the controller module 120 finds the MAC address already listed at one of these locations, the user device is determined to already be recognized and control proceeds to step 416; otherwise, the user device 102 is determined to be unrecognized and control proceeds to step 418.

At step 416, the controller module 120 takes no further action for this locally recognized user device 102 because the hotel's firewall rules 134 are already configured for this user device 102. As illustrated in FIG. 3, the gateway/firewall module 124 will follow the firewall rules 134 in order to either allow or deny access to the Internet 108 for this user device 102 according to the various device-specific zone access expiries 204 shown in the set of authorized user devices 130. In this way, a guest of the hotel may disconnect and reconnect their user device 102 to the hotel LAN 104 any number of times without affecting their already activated HSIA service.

At step 418, the controller module 120 queries the user profile database 152 to determine whether there is a user identifier (ID) that is associated with the MAC address detected at step 412. As shown in FIG. 1, the user profile database 152 in this embodiment is stored remote to the hotel 101 at a central user profile server 150. Therefore, this step may be performed by the processors 118 sending and receiving network packets to/from the user profile server 150 via the first network interface 110 and the Internet 108.

Figure 5:
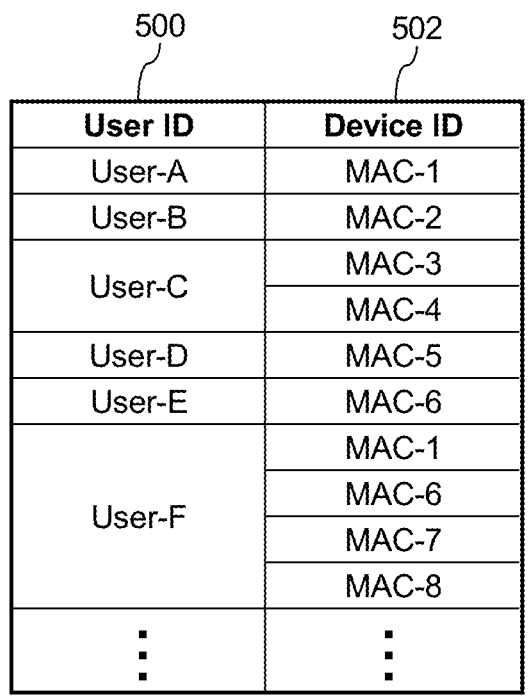
FIG. 5 shows an exemplary user profile database of FIG. 1.

FIG. 5 shows an exemplary user profile database 152. In this example, the user profile database 152 associates each of a plurality of different user identifiers (IDs) in column 500 with one or more device identifier (e.g., MAC addresses in this embodiment) in column 502. As shown, each user ID may be associated with multiple MAC addresses such as when a single user owns multiple user devices 102 such as computers and mobile phones. For example, "User-C" is shown in FIG. 5 associated with "MAC-3" and "MAC-4". In this way, the MAC address of each the user's devices may be associated with the user's ID. Additionally, a single MAC address may be associated with multiple user IDs, for example, "MAC-1" shown in FIG. 5 is associated with "User-A" and "User-F". This may be the case when multiple users share a single device such as a corporate loaner laptop that may be provided as needed to different employees for travel.

Returning again to the description of FIG. 4, at step 420, when the detected MAC address is not associated with any user identifiers (IDs) in the user profile database 152, control proceeds to step 422. Otherwise, when the detected MAC address is associated with one or more user identifiers (IDs) in the user profile database 152, the particular user identifiers (IDs) are retrieved from the user profile database and control proceeds to step 424.

At step 422, the controller module 120 takes no further action for this unknown user device 102 because, as already explained with reference to the operation of the gateway/firewall module 124 shown in FIG. 3, the hotel's gateway/firewall module 124 by default causes unauthorized user devices 102 to display the hotel's predetermined login portal at step 304.

At step 424, the controller module 120 queries the guest database 136 of the hotel 101 to determine whether a current guest of the hospitality establishment is associated with any of the particular user identifiers (IDs) found associated with the detected MAC address at step 420.

FIG. 6 shows an exemplary guest database 136 of the hotel 101. In this example, the guest database 136 is the PMS database used by the PMS module 126 for room assignment at the hotel 101. A room number column 604 indicates the particular guest room and a user identifier (ID) column 604 indicates the user ID of the guest currently registered for that room, with vacant rooms having a "-" in column 604.

In a preferred embodiment, the user identifiers (IDs) in column 500 of FIG. 5 and column 604 of FIG. 6 are loyalty program member identifiers recognized by the hotel 101. A unique user ID is assigned to each guest participating in the hotel's loyalty program such by issuing the guest with a membership card having the user identifier printed thereon. When a guest makes a reservation or when checking into the hotel 101, the guest will provide the hotel 101 with the user's personal user identifier (e.g., loyalty program member identifier), which is thereafter stored in the guest database 136 of the hotel 101 as being associated with the room that is registered to the guest. Discounts or other benefits may be applied to loyalty program members to encourage guests to register their loyalty numbers upon reservation or check-in.

Utilizing loyalty program member identifiers as the user identifiers is beneficial to ensure each guest has a unique user identifier. However, other types of user identifiers may also be utilized in conjunction with the invention. For example, combinations of a user's personal identification information provided to the hotel upon reservation or check-in (name, age, phone #, credit card information, passport number, username, password, etc) may also be utilized in other embodiments.

Returning again to the description of FIG. 4, at step 426, when a current guest of the hotel 101 is associated with one of the particular user identifiers determined at step 418, control proceeds to step 428 to begin automatically activating the HSIA service for the newly connected user device 102. Otherwise, when no current guest of the hotel is associated with any of the particular user identifiers determined at step 418, the users associated with these user identifiers (IDs) are not current guests of the hotel 101. Therefore, the HSIA service is not automatically activated for the user device 102 and control returns to step 422.

At step 428, the controller module 120 automatically activates the HSIA service at the hotel for the newly connected user device by configuring the firewall rules 134 at the hotel to allow traffic to flow between the MAC address of the user device 102 and the Internet 108.

Activating the HSIA service in this embodiment involves adding a row for the newly authorized user device 102 to the set of authorized user devices 130 and then updating the firewall rules 134 accordingly. The new row includes the MAC address determined at step 412 in the device ID column 200 and the particular user ID determined as a result of step 426 in the user ID column 202. As for the zone access expiries in columns 204, these are set according to either a user-specific policy obtained from the user profile database 152 and/or guest database 136, or according to the default HSIA service entitlements 132 of the hotel 101 in various exemplary embodiments.

FIG. 7 shows an example of default HSIA service entitlements 132 based on a user type. In this configuration, when the HSIA service is automatically activated for a new user device 102, the user device's MAC address is given zone access expiries in column 204 according the type of the guest associated with the user ID. To determine the guest type, the controller module 140 receives user information associated with the user identifier.

In one configuration, the user information is retrieved from the user profile database 152. For example, the user profile database 152 may associate each unique user ID with a user type value of either "Regular User" or "VIP" (an example of such an association is shown later in FIG. 9). Again, utilizing the example that the user IDs correspond to loyalty program member identifiers, some users may be entitled to VIP status as a result of frequent stays at the hotel, for example.

In another configuration, the controller module 120 retrieves the user information associated with the user identifier from the hotel's guest database 136 (e.g., hotel's PMS database in some embodiments). For instance, some rooms of the hotel 101 may be higher priced and therefore bestow VIP status to any user registered in that room for the duration of their stay.

Once the user information associated with the user identifier is retrieved, the controller module 120 automatically activates the HSIA service for the user device at the hotel with a service entitlement set according to the user information. With reference to FIG. 7, when the user information specifies the user is a "Regular user", the controller module 120 sets the zone access expiries in column 204 so that the user device will receive Internet access from the lobby zone 144 for 48 hours and from the guest rooms zone 144 for 24 hours. Alternatively, when the user information specifies the user is a "VIP", the controller module 120 sets the zone access expiries in column 204 so that the user device will further receive 24 hours of Internet access from other zones 144 in the hotel such as the conference rooms and coffee shop zones 144. The controller module 120 then updates the firewall rules 134 according to the new row in the set of authorized user devices 130 and the HSIA service is thereby activated for the newly connected user device 102 with a service entitlement set according to user information.

Figure 8:
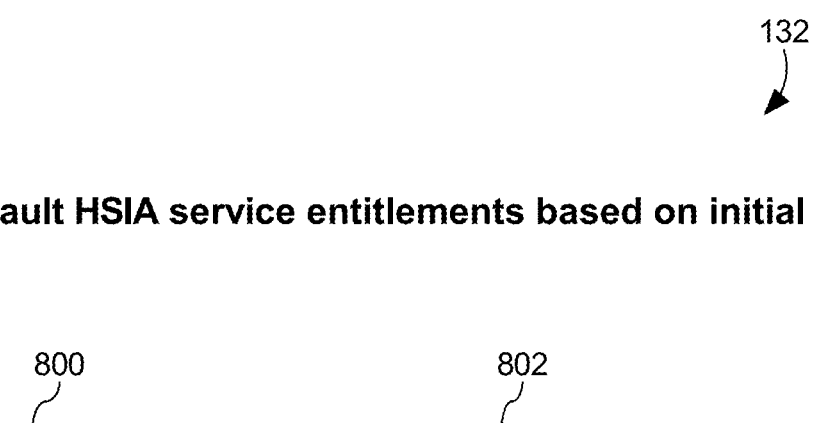
FIG. 8 shows an example of the default HSIA service entitlements of FIG. 1 based on an initial zone of the hotel at which the user device is located when the HSIA service is automatically activated.

FIG. 8 shows an example of default HSIA service entitlements 132 based on an initial zone 144 of the hotel 101 at which the user device 102 is located when the HSIA service is automatically activated. In order to determine the initial zone required in this embodiment, the controller module 120 may utilize any of the techniques previously described for determining the source zone at step 306. As the automatic HSIA service activation process shown in FIG. 4 will generally proceed very quickly from step 410 to step 428, the first time the controller module 120 determines the zone at which the user device 102 is currently located, this will generally correspond to the initial zone from which the user device 102 was connected to the hotel LAN 104.

As shown in FIG. 8, each initial zone in column 800 has a unique set of zone access time entitlements in columns 802. The controller module 120 therefore sets the zone access expiries in column 204 of the set of authorized user devices 130 for the new user device 102 according to the entitlements of the determined initial zone, and updates the firewall rules 134 accordingly. The HSIA service is thereby activated for the newly connected user device 102 with a service entitlement set according to the initial zone at which the user device 102 is located when the service is automatically activated.

Returning again to the description of FIG. 4, at step 430, the controller module 120 updates login statistics for the HSIA users at the hotel 101. For instance, each time the HSIA service is automatically activated for a newly connected user device 102, the controller module 120 may update various HSIA statistics such as those related to the currently logged in users (tracked by user IDs) and the user devices 102 in use by each user (tracked by MAC addresses). A new user login counter may be incremented each time step 430 is reached. In this way, hotel staff or other administrators may track HSIA usage by the hotel 101 guests even though there is no manual login process performed at the hotel's web-based login portal when the HSIA service is automatically activated for some user devices 102 at step 428.

An advantage of automatically activating the hotel's HSIA service according to the embodiment shown in FIG. 4 is that certain user devices 102 may immediately access the Internet 108 upon connection to the hotel LAN 104 without requiring the user device to access a web-based login portal and without requiring a user to make changes to the configuration of the user device 102.

Regarding control of which user devices 102 will have the HSIA service automatically activated, FIG. 9 illustrates a UI screen 900 provided by the UI module 122 allowing modification of information stored in the user profile database 152 for an exemplary user. In this embodiment, each guest of the hotel 101 may access UI screen 900 being a webpage in order to modify the device identifiers associated with their user profile.

As shown in FIG. 9, each user may have any number of user devices 102 associated with their user profile account. User device names are listed in column 900 with each user device's corresponding device identifier (e.g., MAC address) shown in column 902. These fields are editable by the user, and the user may add new user devices or remove user devices to their user profile at any time.

The UI screen 900 further allows each guest of the hotel 101 to modify the user identifiers associated with their account. As shown in FIG. 9, the user identifiers associated with the account in this example are all the various loyalty program membership numbers utilized by the user at different hospitality establishments. Each hospitality establishment is listed in column 910 with the user's corresponding loyalty program member identifier and user type listed in columns 912 and 914, respectively. In some embodiments, the user may be able to freely adjust the loyalty numbers in column 912, but may need to perform an upgrade process by clicking an "upgrade" button 920 in order to upgrade to higher user type at a particular hospitality establishment in column 914. For example, the upgrade process may involve a payment.

In addition to the UI module 124 within the service controller 106 at the hotel 101, the user profile server 150 may also be configured to provide web-based access to UI screen 900. In this way, any user may access their user profile UI screen 900 from any location over the Internet 108.

Before accessing UI screen 900, users may need to authenticate themselves to either the UI module 124 or the user profile server 150 such as by entering a username/password combination. Additionally, staff at the hotel 101, call center support staff, and administrators of the user profile server 150 may be able to access the UI screen 900 for any user account in order to assist users when required.

An exemplary use case scenario of this embodiment proceeds as follows: A user creates a user profile on the user profile server 150. By interacting with UI screen 900, the user stores on their user profile the MAC addresses of the electronic devices 102 they will bring to the hotel 101 and for which they want to have the HSIA service automatically activated, and stores the loyalty program number identifiers belonging to the user at the hospitality establishments at which the user will be a guest. The user then travels to any of the listed hospitality establishments and connects any of the listed user devices 102 to the local LAN 104 available at the hospitality establishment.

The newly connected user device 102 utilizes DHCP in order to obtain an IP address on the LAN 104 and the process shown in FIG. 4 begins at step 410. At step 418, the service controller 106 at the hospitality establishment queries the user profile database 152 in order to determine whether the MAC address of the connected user device is associated with a loyalty program member identifier specific to that hospitality establishment.

In some embodiments, each hospitality establishment has a unique site identifier and this information may be utilized when querying the user profile database 152 in order to obtain the loyalty program member identifier associated with the MAC address at the specific hospitality establishment where the MAC address was detected.

For example, with reference to FIG. 9, when the user is staying at the "Galactic Hotel (4)", the MAC address of the user's mobile phone ("00-E4-A1-32-C3-39") is determined to be associated with user identifier "122-32-2345". Alternatively, when the user is staying at the "Beaches Resort (135)", the same MAC address of the user's mobile phone ("00-E4-A1-32-C3-39") is determined to be associated with a different user identifier "5E3DA7". The user may thereby travel to different hospitality establishments having different types of the loyalty program member identifiers, and the user's various user devices are recognized and correlated to the user's respective user identifier as employed at each of the different hospitality establishments.

After determining a user identifier associated with the MAC address, the service controller 106 at the hospitality establishment then queries the guest database 136 of the hospitality establishment to determine if the user identifier is associated with a guest of the hospitality establishment. When at least one of the current guests of the hospitality establishment is associated with the determined user identifier, the service controller 106 automatically activates the HSIA service at the hospitality program for the newly connected user device 102 at step 428.

Because the automatic service activation process of FIG. 4 begins in this embodiment upon receiving a DHCP message containing the user device's MAC address, the HSIA service activation at step 428 automatically occurs soon after the connection of the user device 102 to the LAN 104. Therefore, the user is generally able to access external websites 160 on the Internet 108 immediately after connection to the hotel LAN 104. In the event that the user device 102 requests an external website 160 before the firewall rules 134 are updated to activate the HSIA service for the user device 102 and is therefore blocked at step 304, upon a subsequent retry of the connection request by the user device 102, the firewall rules 134 will have been updated and the connection request will succeed. Delay to the user is thereby minimized in this embodiment by triggering the start of the automatic service activation process of FIG. 4 with the detection (at step 410) of an unrecognized MAC address in a DHCP message on the LAN 104.

In some embodiments, the service controller 106 automatically adds the device identifier of a particular user device 102 to the user's profile when the user utilizes the user device 102 at the hospitality establishment.

Figure 10:
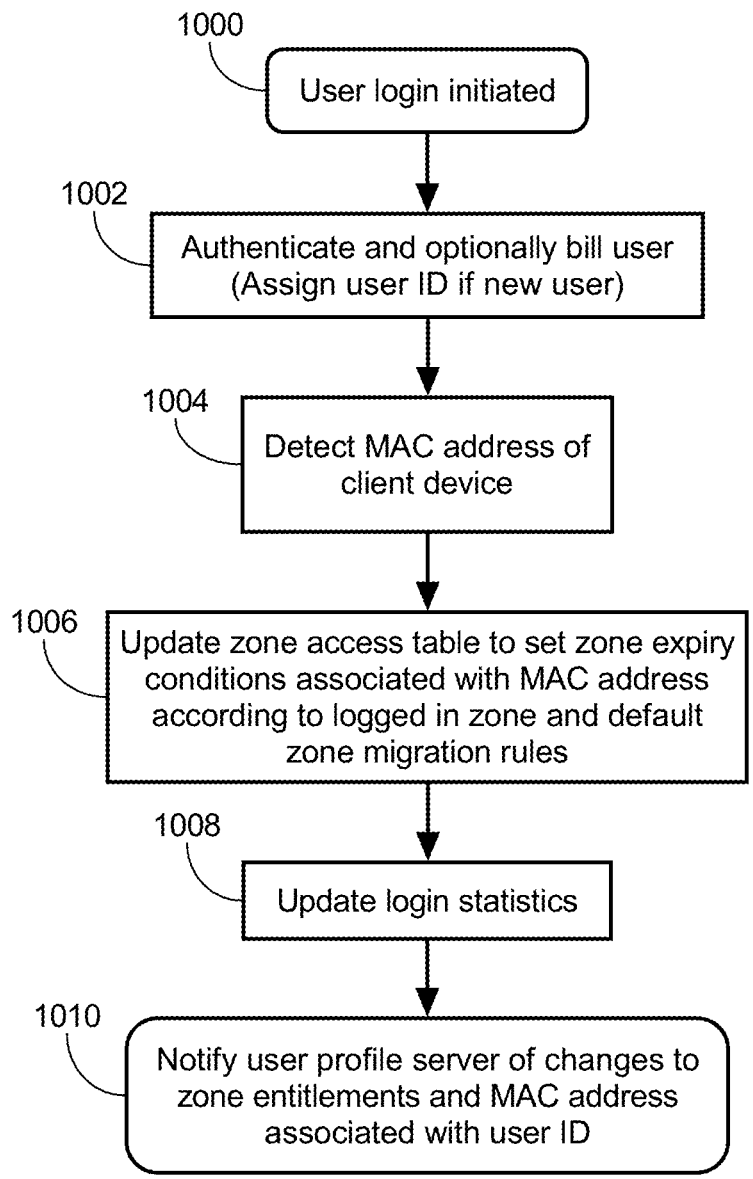
FIG. 10 shows a flowchart describing steps performed by the service controller of FIG. 1 upon user login at the hotel's web-based login portal in order to automatically create or modify the user profile settings for the user.

FIG. 10 shows a flowchart describing steps performed by the service controller 106 upon user log in at the hotel's web-based login portal in order to automatically create or modify the user profile settings for the user. The steps of the flowchart of FIG. 10 are not restricted to the exact order shown, and, in other embodiments, shown steps may be omitted or other intermediate steps added. In this embodiment the processors 118 execute the controller module 120 in order to cause the service controller 106 to perform the illustrated steps.

At step 1000, user login to the hospitality establishment is initiated such as performed by the gateway/firewall module 124 causing an unauthorized user device 102 to display a predetermined login portal at step 304 of FIG. 3.

At step 1002, the guest signs up for Internet access at the login portal. In order to authenticate the user as a part of the login process, user authentication information is received from the user device 102. When the guest is an individual staying at the hotel, the guest enters their room number and payment information. As a part of authentication, the control module 120 determines the user identifier corresponding to the received user authentication information. The controller module 120 then queries the guest database 136 of the hospitality establishment as illustrated in FIG. 6 in order to determine the user identifier corresponding to the user registered in the room number entered by the user during the login process. If the user is not associated with a user identifier such as when the user is not currently a member of the hotel's 101 loyalty program, the user may be offered to join the loyalty program and assigned to a new user identifier (e.g., loyalty program membership identifier) at this step.

At step 1004, the controller module 120 detects the user identifier (i.e., MAC address) of the user device 102. This may be done by direct packet inspection when the packets received from the user device 102 include the MAC address, or by querying an intermediate switch 140 or access point 142 to determine the MAC address associated with the user device's IP address when the packets received from the user device 102 only include its IP address.

At step 1006, the controller module 120 adds a row to the set of authorized user devices 130 and updates the firewall rules 134 to include one or more corresponding device-specific rules that allow data to flow between the Internet and the unique media access control (MAC) address of the particular user device 102 for the authorized zones 144. In this way, the HSIA service is activated for the user device after the user has logged in at the login portal.

At step 1008, the controller module 120 updates the login statistics of the HSIA users at the hotel 101 due to the new user logging in. This may be similar to as previously described for updating the statistics after the HSIA service is automatically activated for a user device at step 430 of FIG. 4.

At step 1010, the controller module 106 associates in the user profile database 152 the device identifier of the user device detected at step 104 with the corresponding user identifier determined (or newly assigned) at step 1002. In this way, after a user has logged in from a particular user device 102 at the hotel's login portal such as offered by the UI module 122, the central user profile database 152 is automatically updated to contain a mapping between the device's MAC address and the user's ID. In the future, the guest may continue using the same user device 102 (e.g, having the same MAC address device identifier) at the same or other hospitality establishments served by the user profile server 150. At each hospitality establishment, the user device 102 will be automatically logged in to the network and the HSIA service automatically activated by following the process of FIG. 4. In this way, the user's device MAC address is automatically registered in the user's profile without requiring the user to manually update their user profile in the user profile database 152.

Figure 11:
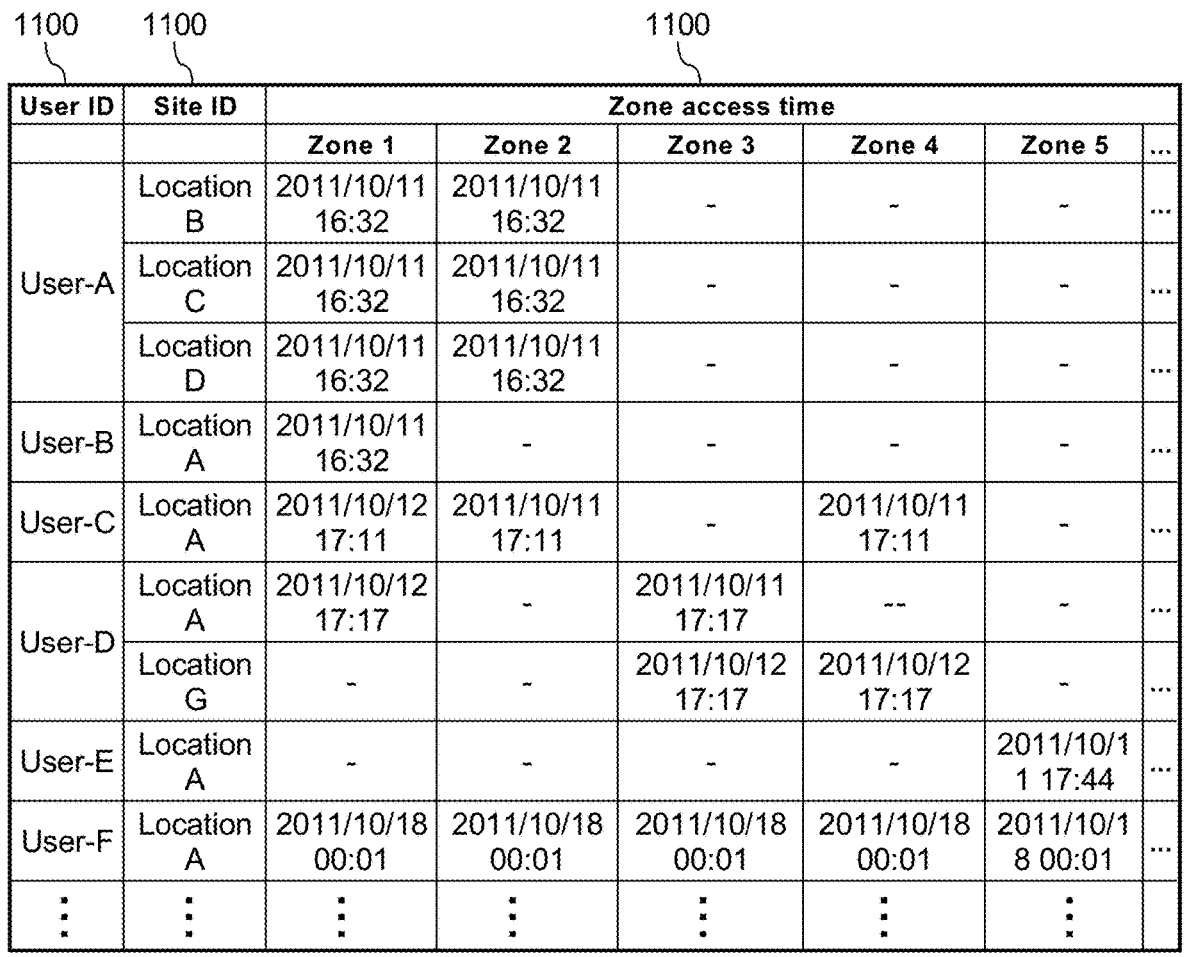
FIG. 11 illustrates how the user profile database of FIG. 1 may further store service entitlements for different users at specific hospitality establishments.

Other information may also be stored within the user profile database 152 in some embodiments. For example, FIG. 11 illustrates how the user profile database 152 further stores service entitlements for different users at specific hospitality establishments. This user information may be retrieved from the user profile database 152 and utilized at step 428 in order to automatically activating the HSIA service at specific hospitality establishment identified according to its site ID 1100 at step 428 of FIG. 4.

Figure 12:
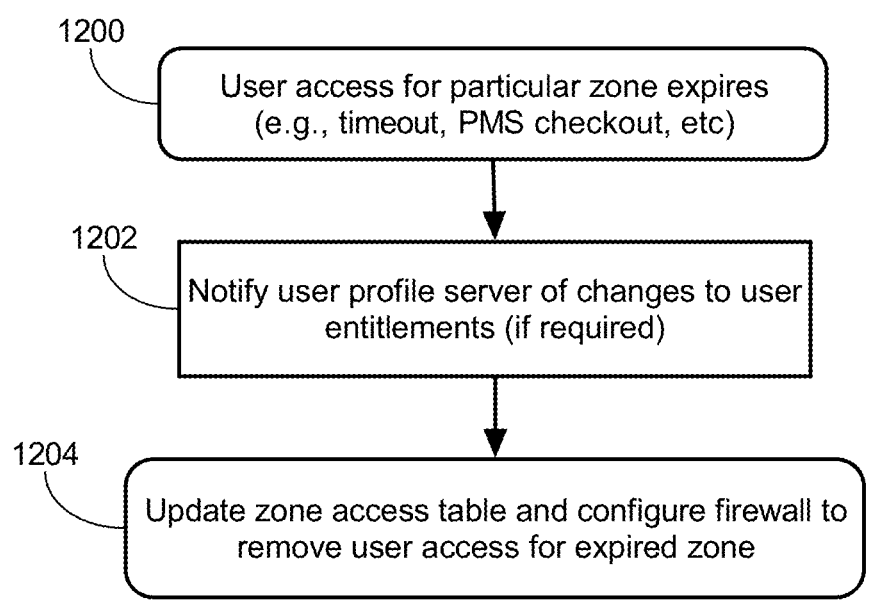
FIG. 12 illustrates a flowchart of operations of the controller module of FIG. 1 expiring zone access for a particular user device according to an exemplary embodiment.

FIG. 12 illustrates a flowchart illustrating operations of the controller module 120 expiring zone access for a particular user device 102 according to an exemplary embodiment. The steps of the flowchart of FIG. 12 are not restricted to the exact order shown, and, in other embodiments, shown steps may be omitted or other intermediate steps added. In this embodiment the processors 118 execute the controller module 120 in order to cause the service controller 106 to perform the illustrated steps.

The process begins at step 1200 when the controller module 120 determines that the zone access expiry time in column 204 of the set of authorized user devices 130 in FIG. 2 has been reached. Alternatively, the process may begin at this step when the PMS at the hotel 101 (e.g., the PMS module 126 in FIG. 1) sends a checkout message to the controller module 120 informing the controller module 120 that a guest of a particular guest room as now checked out of the guest room. In yet another example, the process may start when a current event such as a meeting or conference or a guest reservation at the hotel ends.

At step 1202, the controller module 120 updates the user profile database 152 to remove the expired zone access times if required. For example, when all zone access times for a particular user at a particular site ID are now expired, the row for this particular site ID as depicted in FIG. 11 may be deleted from the user profile database 152.

At step 1204, the controller module 120 updates the set of authorized user devices 130 according to the expired zone access (similar to step 1202, when a particular user device 102 is no longer authorized for Internet access from any zone such as illustrated for the "MAC-1" user device 102 in FIG. 2, the corresponding row may be deleted from the set of authorized user devices 130). The controller module 120 then updates the firewall rules 134 to remove the device-specific exceptions for the user device for the expired zones 144 of the hotel 101.

FIG. 13 illustrates a UI screen 1300 allowing an event organizer to adjust a set of event-specific network settings for a particular event as stored in a reservation database such as the hotel's PMS (illustrated in FIG. 1 as the guest database 136). In this example, the UI screen 1300 is a web page screen generated by the processors 118 executing the UI module 122. The UI module 122 further configures the processors 118 to send hypertext markup language (HTML) for the UI screen 1300 to an authorized destination via the network interface 112. The service controller 106 may thereby behave as a web server allowing event organizers, hotel staff, or other users to make event reservations and configure different sets of event-specific network settings for different events at the hotel 101. According to user selections and input made on the UI screen 1300 for a particular event, the processors 118 store the specified set of event-specific network settings in the guest database 136.

As illustrated in the bottom portion of the UI screen 1300, the registered device settings allow the event organizer (or hotel staff) to configure any number of specific registered user devices for the event. In this example, two registered user devices (e.g., a printer and a teleconferencing webcam) are shown on separate rows of the registered device settings of UI screen 1300. For each registered user device 102, the UI screen 1300 allows a number of device-specific network settings to be configured for the particular event (e.g., one device-specific network setting per column in UI screen 1300).

The device name setting 1302 provides a human-readable description to identify the registered user device. The MAC address setting 1304 represents the device identifier of the registered user device and allows the event organizer to input the unique MAC address of the registered user device. The auto login setting 1306 allows the event organizer to specify that the hotel's HSIA service should be automatically activated for the user device upon detection of its MAC address on the hotel LAN 104 during the event. Although the event may require other user devices to be redirected to a login page before activating the HSIA service during the event, registered user devices having the auto login setting 1306 enabled will be granted Internet access upon connection to the LAN 104 without requiring the device to be redirected to the login page. The device-specific bandwidth limits settings 1308 allow the event organizer to allocate a specific bandwidth cap and/or rate to the registered user device. The HSIA service will be automatically activated with these service entitlements.

Figure 14:
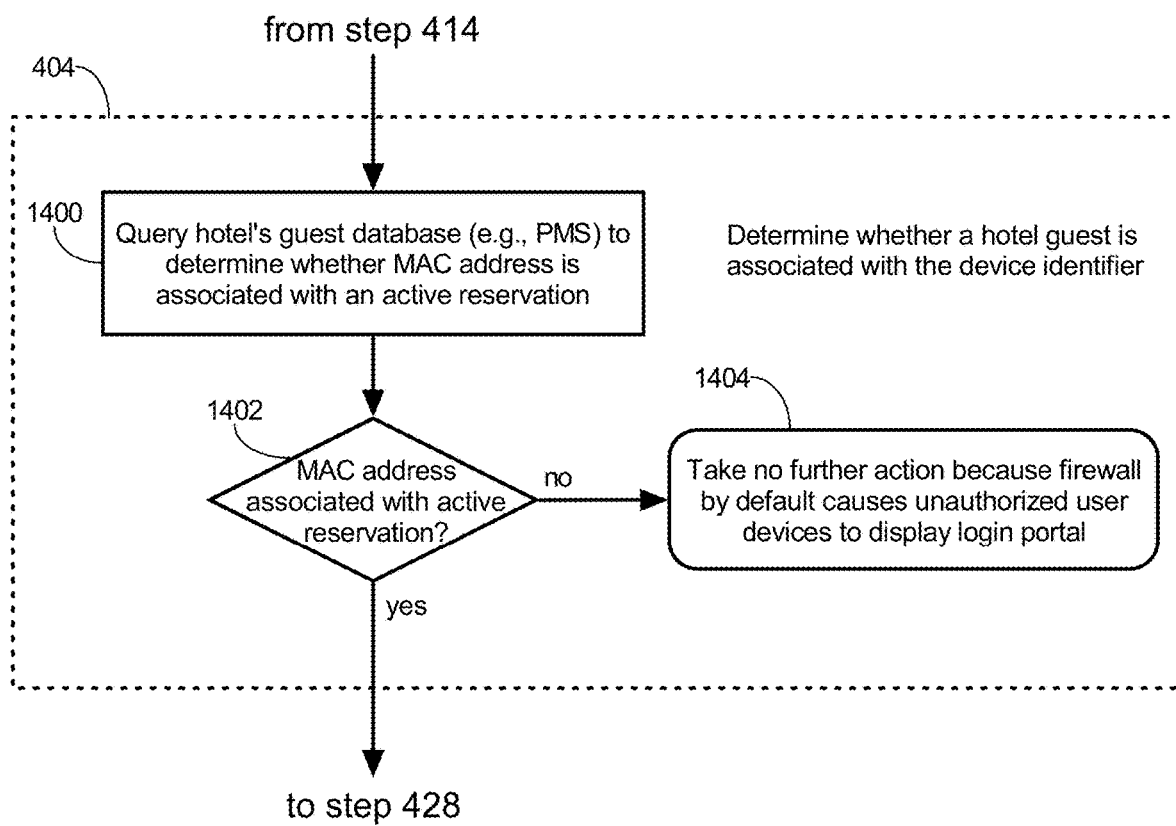
FIG. 14 illustrates a method of determining whether a hotel guest is associated with a particular device identifier by checking a reservation database of the hospitality establishment.

FIG. 14 illustrates a method of determining whether a hotel guest is associated with a particular device identifier by checking a reservation database of the hospitality establishment. In some embodiments, step 414 of FIG. 4 may be replaced with (or further include) the steps shown in FIG. 14. The steps of the flowchart are not restricted to the exact order shown, and, in other embodiments, shown steps may be omitted or other intermediate steps added. In this embodiment, the processors 118 execute the controller module 120 in order to cause the service controller 106 to perform the following illustrated steps.

At step 1400, the controller module 120 queries a reservation database of the hospitality establishment such as guest database 136 to determine whether a device identifier detected on the hotel's LAN 104 is associated with an active reservation of the hospitality establishment. In this example, the device identifier is a MAC address in a DHCP message broadcast on the hotel LAN 104 upon connection of the user device to the hotel LAN 104. Taking the exemplary medical conference event illustrated in FIG. 13 as an example, this reservation will be deemed to be an active reservation after the reservation's specified start-time has been reached and before the reservation's end-time has been reached. During this time period, the MAC address ("09:A1:47:12:EF:31") of the teleconferencing webcam 1322 will be deemed to be associated with the event in the context of the HSIA service because the auto login setting 1306 for webcam 1322 is enabled.

At step 1402, when the controller module 120 determines that the device identifier is associated with an active reservation, control proceeds to step 428; otherwise, the user device is deemed unauthorized and control proceeds to step 1404. For example, when the MAC address 1304 of a teleconferencing web cam 1322 is detected on the hotel LAN 104 while the reservation is active (e.g., after the reservation's start-time has been reached and before the reservation's end-time has been reached), control proceeds to step 428 to automatically activate the HSIA service for the user device with a 5 Mbit/s bandwidth cap and rate service entitlement to ensure sufficient video quality during the event. Other service entitlements such as assigning the user device with a specific public IP address may be included as illustrated.

Rather than an event reservation as illustrated in FIG. 13, in another example, the controller module 120 at step 1400 queries the guest database 136 of the hotel 101 to determine whether the device identifier detected on the hotel's LAN 104 is associated with a guest's reservation. Guests may specify in their reservation one or more MAC addresses for which HSIA is to be automatically activated at the hotel 101. Thereafter, when the specified MAC addresses are detected on the hotel LAN 104 while the reservation is active (i.e., within a predetermined time period spanning the time the guest is to check-in and check-out of the hotel 101), the result of step 1402 is "yes" and control proceeds to step 428 to automatically activate the HSIA service for the user device 102.

Although an active reservation in the above embodiments is defined as having reached its start-time but not yet reached its end-time, in other embodiments, a reservation may also be deemed active when the current time is within a predetermined duration before the start-time of the reservation has been reached and within a predetermined duration after the end-time of the reservation has been reached. For example, when the controller module 120 queries the guest database 136 for a detected MAC address at step 1402, the detected MAC address may be found at step 1402 to be associated with a particular guest's reservation being associated with the MAC address up to two hours before the reservation indicates the guest is schedule to arrive and up to three hours after the reservation indicates the guest is scheduled to depart.

Figure 15:
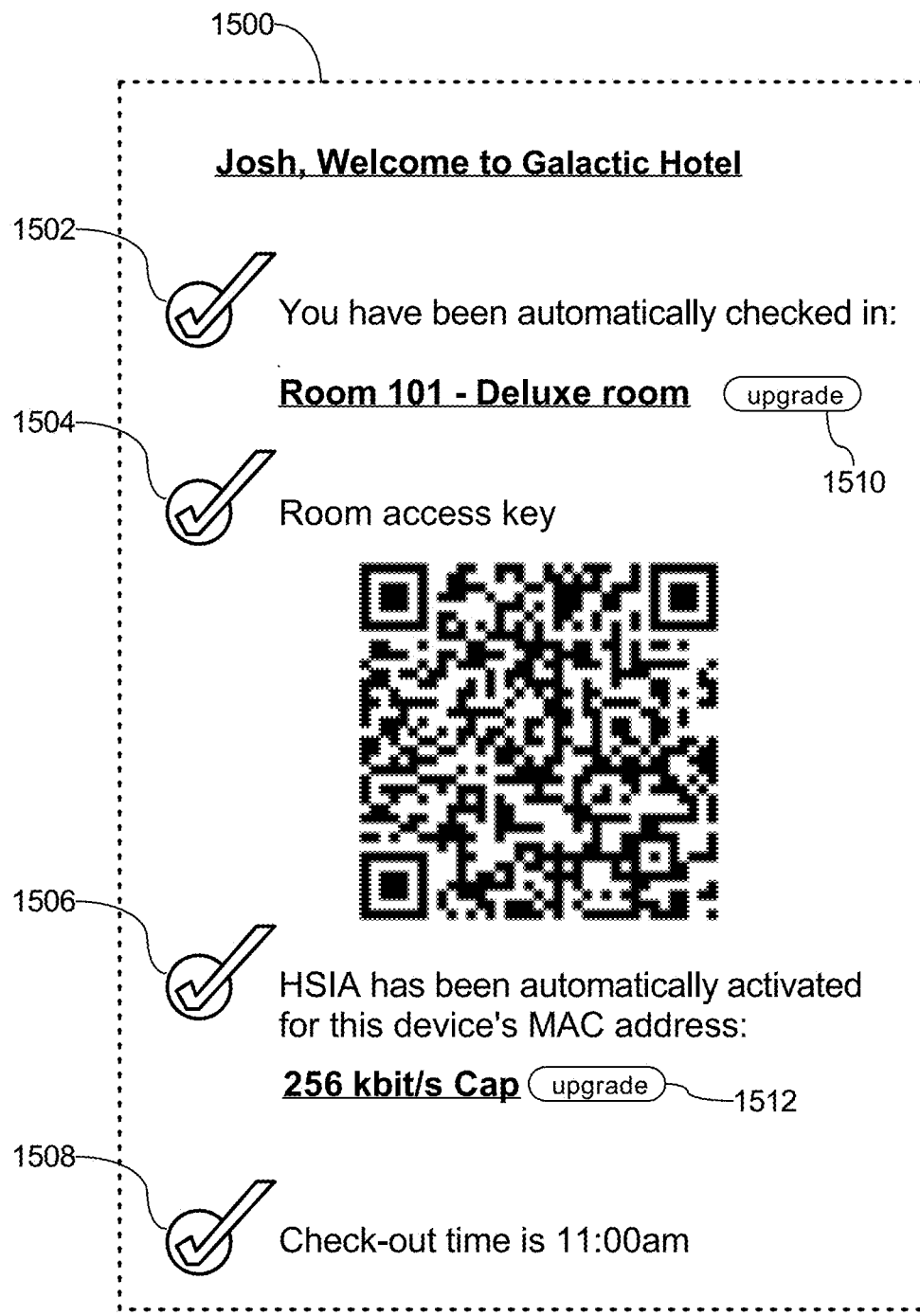
FIG. 15 illustrates a guest-specific UI screen sent to a user device after activating an automated check-in process according to another embodiment of the invention.

In other embodiments, automatically activating a service for a user device 102 at a hospitality establishment involves additional or other services besides the HSIA service. For example, FIG. 15 illustrates a guest-specific UI screen 1500 sent to a user device 102 after performing an automated check-in process according to another embodiment of the invention. In this embodiment, the automatic service activation process as described above for FIG. 4 behaves substantially as previously described, except at step 428, in addition to automatically activating the HSIA service for the user's device 102, the automatic service activation further involves the controller module 120 automatically checking the user into the hotel 101 and generating a unique door key code for the guest's registered room.

In this embodiment, at step 428 the UI module 122 sends the UI screen 1500 to the user device 102 for display to the guest. The UI screen 1500 includes a first message 1502 informing the guest that they have been automatically checked-in to a particular guest room (e.g., "Room 101" in this example). An upgrade button 1510 allows the guest to upgrade their room to a higher priced room; additional fees may apply and therefore the UI screen 1500 allows the hotel to upsell their more profitable rooms.

A room access key 1504 is included to allow the guest to open the door locks on their assigned room. In this embodiment, the room access key 1504 is a QR Code® embedding an access code that will be accepted by an optical scanner near the room's door and will cause the door to unlock. (QR Code is registered trademark of DENSO WAVE INCORPORATED.) The access code may be randomly generated by the controller module 120 so that the code is unique for each new guest registered for the room. Previous guests of the room are thereby unable to open the door after check-out to ensure security.

A third message 1506 of the UI screen 1500 informs the guest that the HSIA service at the hotel 101 has been automatically activated for the user device 102. As shown, the HSIA service in this example was automatically activated for the guest's device at 256 kbit/s; however, an upgrade button 1512 allows the guest to upgrade their bandwidth to a higher speed. Again, additional fees may apply and therefore the UI screen 1500 allows the hotel to upsell bandwidth. Upgrades for any of the services automatically activated at step 428 or other services in the hotel may be offered via UI screen 1500 in a similar manner.

Additionally, a fourth message 1508 informs the guest of other guest-specific information related to their stay at the hotel 101 such as the applicable check-out time.

In some embodiments, the UI screen 1500 may be sent to a predetermined application running on the guest's user device. For example, a user may have a user profile such as illustrated in FIG. 9 associating their mobile phone with their loyalty program member identifier at a hotel 101. The guest may then make a reservation at the hotel 101 for a certain date and specify their loyalty program member identifier in the reservation. On the date of the reservation, the user may simply arrive at the hotel lobby and utilize their mobile phone to connect to the hotel's wireless network (e.g., by wirelessly associating the mobile phone with an AP 142 at the hotel).

Upon wireless connection with the hotel's wireless network, a predetermined application running on the guest's user mobile phone detects the connection with the hotel 101 and receives the guest-specific UI screen 1500 from the UI module 122 via the hotel LAN 104. The application may then present itself to the user and display the guest-specific UI screen 1500. In this way, the guest is automatically checked in to the hotel upon arrival by the service controller 106 recognizing the user's mobile device's identifier on the LAN 104, and the user is not required to interact with front desk staff at the hotel. The information and door key for the guest's stay is transmitted to their mobile phone, which is also automatically authorized for Internet access.

In other embodiments, rather than the predetermined application automatically detecting the connection to the hotel LAN 104, the user may be required to manually start the predetermined application upon arrival at the hotel 101. In yet other embodiments, rather than sending the UI screen 1500 to a predetermined application, the UI screen 1500 may represent a webpage accessible by the user device such as when the user navigates to a predetermined web address.

The predetermined web address may be included on a confirmation of the reservation and sent to the mobile device prior to arrival such as via confirmation email to the user.

In yet other embodiments, the user device may be caused to display the UI screen 1500 upon arrival at the hotel 101 similar to how a user device 102 is caused to display a login portal at step 304, for example, by redirecting the user's first web access request to the UI module 124 to receive the UI screen 1500.

Although not a requirement, the invention is well suited to incorporation in loyalty programs. For example, as a benefit of the loyalty program, members are automatically logged in at participating venues and automatically receive customized network access on their personal devices. Higher HSIA bandwidth and access entitlements from a greater number of zones may be automatically provided, for example. The entitlements may be automatically increased as the loyalty program member accumulates points in some embodiments. A loyalty program user configuration web page such as illustrated in FIG. 9 may allow users to associate themselves with different MAC addresses such as after they purchase a new device. Similarly the page may allow them to de-associate themselves if they are no longer using a device having a particular MAC address.

To further increase security, the system 100 may also spot conflicts such as when user devices 102 using the same MAC address are simultaneously connected at different hospitality establishments. Upon detection of such a conflict (either in real time or at a later date such when running a report), the MAC address may be automatically blocked from being associated with user IDs. The user ID may also be flagged for follow-up examination or to require manual login.

To prevent a guest of a hospitality establishment detecting another guest's MAC address (i.e., to use for MAC spoofing purposes), all wireless connections between user devices 102 and wireless APs 142 may be encrypted, and all wired connections between user devices 102 and switches 140 may be isolated from other wired connections. In this way, eavesdropping of other user device's 102 MAC addresses is prevented.

In some embodiments, determining whether a hotel guest is associated with a detected device ID (at step 404 shown in FIG. 4 and FIG. 14) may be enhanced by further confirming that the guest is also an authorized user of the zone 144 at which the user device 102 is currently located. The automatic service activation at step 428 may only take place when the user device 102 is located in an authorized zone.

For example, the controller module 102 may query the guest database 136 of the hotel 101 to determine an authorized zone 144 of the hospitality establishment for which the particular guest is authorized. Taking the "User-B" in room "101" as shown in FIG. 6, this user may be determined by the controller module 120 to be authorized for the guest rooms zone 144 of the hotel 101. The controller module 120 then detects a current zone within the hotel 101 at which the user device is located. For example, this may be performed utilizing similar techniques as previously described for determining the source zone at step 306 of FIG. 3. The controller module 120 thereafter automatically activates the HSIA service for the user device 102 at step 428 when the current zone matches the authorized zone. In this way, the HSIA service is only activated for the guest when they move into the guest rooms zone 144 of the hotel. If the guest is in another zone 144 such as a conference room or staff admin zone 144, the HSIA service is not automatically activated.

In a preferred embodiment, the guest database 136 corresponds to a property management system (PMS) of the hospitality establishment. Although the guest database 136 has generally been described as actually being the hotel's PMS, in some embodiments, the guest database 136 may in fact be a cached version of the PMS data for all rooms in the hotel. This is beneficial when the hotel 101 already has a dedicated PMS. In order to check if a guest of the hotel is associated with a particular user ID of the hotel, the controller module 120 simply queries the PMS data (whether a cached version or not). The user ID may be the guest's name, or the user ID may be a more specific guest identifier such as a loyalty program number associated with the guest. Using a more specific user identifier such as loyalty program number is beneficial to avoid ambiguities caused by many people having the same name.

In an exemplary embodiment, the hotel 101 may offer all users the same default access level in which case all new user devices automatically receive the same access levels when the service is activated at step 428. In another exemplary embodiment, when the new user device is connected to "Conference room A", assuming the user ID associated with the client device is a current guest and is registered for Conference room A, the client device may be automatically authorized for the HSIA service from the Lobby zone, Conference room A zone, and Guest rooms zone. In yet another exemplary embodiment, when the MAC address of the user device 102 is associated with a user ID at the VIP level, assuming the user ID correlated with a registered guest in the hotel's PMS (this may also involve confirming the user device is connected to the specific room/zone for which the guest is registered), the user device 102 is automatically authorized to access the HSIA service for all zones in the hotel.

In an exemplary embodiment, automatic service activation is performed for a user device in response to receiving DHCP address configuration messages when the device's MAC address is correlated to a user ID that matches a guest at the hospitality establishment. A service controller 106 includes a network interface 112 for coupling to a LAN 104 of a hospitality establishment such as hotel 101, and one or more processors 118 coupled to the network interface 112. The one or more processors 118 are configured to detect a device identifier such as a MAC address of a user device 102 on a LAN 104 of the hospitality establishment, determine whether a guest of the hospitality establishment is associated with the device identifier; and automatically activate a service for the user device 101 at the hospitality establishment in response to detecting the device identifier on the LAN 104 when a guest of the hospitality establishment is determined to be associated with the device identifier.

Although the invention has been described in connection with a preferred embodiment, it should be understood that various modifications, additions and alterations may be made to the invention by one skilled in the art.

For example, although the invention has been described as being utilized at a hotel 101, the invention is equally applicable to any hospitality related establishment or service wishing to automatically activate services for user devices including but not limited to hotels, motels, resorts, conference centers, hospitals, apartment/townhouse complexes, restaurants, retirement centers, cruise ships, busses, airlines, shopping centers, passenger trains, etc. The invention may also be beneficially employed in other applications outside the hospitality industry such as by corporations or any other entity wishing to automatically activate a service for certain user devices.

In another example modification, messages other than DHCP may be utilized to detect a device identifier on the LAN 104 of the hospitality establishment at step 400, for example, any message (packet, frame, etc) received at the service controller 106. Additionally, different types of device identifiers other than MAC addresses may be utilized to identify user devices 102 in other embodiments, for example, subscriber identifier module (SIM) card numbers, Internet protocol (IP) addresses, hardware or software serial numbers, etc.

In another example modification, rather than only activating the HSIA service at step 428 for the single MAC address of the user device 102 that was detected on the LAN 104, the controller module 120 may automatically activate the HSIA service for the MAC addresses of all of the user devices 102 associated with the user in columns 902 and 904 of FIG. 9. In other words, when the exemplary user of FIG. 9 arrives at a new hotel and connects their mobile phone to the hotel LAN 104, the process of FIG. 4 proceeds as previously described except at step 428 the HSIA service is activated for all three of the user's devices as listed on the user's profile (e.g., the user's mobile phone, corporate netbook, and teleconferencing webcam).

The various separate elements, features, and modules of the invention described above may be integrated or combined into single units. Similarly, functions of single elements, features, and modules may be separated into multiple units.

The modules may be implemented as dedicated hardware modules, and the modules may also be implemented as one or more software programs executed by a general or specific purpose processor to cause the processor to operate pursuant to the software program to perform the above-described module functions. In some embodiments, rather than a single integrated service controller 106 having each of the modules 120, 122, 124, 126, 128 illustrated in FIG. 1, the service controller 106 only includes the controller module 120; the other modules 122, 124, 126, 128 and their associated data are implemented on one or more separate computer servers.

The flowcharts may be implemented as processes executed by dedicated hardware, and may also be implemented as one or more software programs executed by a general or specific purpose processor(s) 118 to cause the processor(s) 118 to operate pursuant to the software program to perform the flowchart steps. For example, a computer-readable medium such as module storage device 114 stores computer executable instructions that when executed by a computer cause the computer to perform above-described steps of FIG. 3, FIG. 4, FIG. 10, FIG. 12, and FIG. 14. Examples of the computer-readable medium include optical media (e.g., CD-ROM, DVD discs), magnetic media (e.g., hard drives, diskettes), and other electronically readable media such as flash storage devices and memory devices (e.g., RAM, ROM).

The computer-readable medium may be local to the computer executing the instructions, or may be remote to this computer such as when coupled to the computer via a computer network. For example, the service controller 106 of FIG. 1 may be implemented by a computer having one or more processors 118 executing a computer program loaded from a hard drive or other non-transitory storage medium located within the computer or elsewhere to perform the steps of the various flowcharts and above description. In one embodiment, the computer is a computer server connected to a network such as the Internet 108 and the computer program stored in the hard drive may be dynamically updated by an update server (not shown) coupled to the Internet 108. In addition to a dedicated physical computing device, the word "server" may also mean a single computer, virtual computer, or shared physical computer, for example.

Unless otherwise specified, features described may be implemented in hardware or software according to different design requirements. Additionally, all combinations and permutations of the above described features and embodiments may be utilized in conjunction with the invention.

What is claimed is:

1. An apparatus for controlling automatic check-in at a hospitality establishment, the apparatus comprising:
   a storage device;
   a network interface for coupling to a computer network of the hospitality establishment; and
   one or more processors coupled to the storage device and the network interface;
   wherein, by the one or more processors executing a plurality of software instructions loaded from the storage device, the one or more processors are configured to:
      detect a device identifier of a user device in network traffic transmitted on the computer network of the hospitality establishment;
      search a set of authorized user devices to determine whether the device identifier corresponds to any locally recognized user device at the hospitality establishment;
      in response to determining that the device identifier corresponds to a locally recognized user device, take no further action because a firewall at the hospitality establishment has already been configured with one or more device-specific rules for the locally recognized user device;
      in response to determining that the device identifier does not correspond to any locally recognized user device at the hospitality establishment, query one or more databases of the hospitality establishment to determine whether the device identifier is associated with a new guest registered for a particular room of the hospitality establishment; and
      send a room access key to the user device via the computer network and configure the firewall with at least one rule allowing Internet access for the user device in response to determining that the device identifier is associated with the new guest registered for the particular room;
      wherein the room access key allows the new guest registered for the particular room to open a door lock of the particular room.

2. The apparatus of claim 1, wherein the one or more processors are further configured to generate the room access key to be different for each new guest registered for the particular room.

3. The apparatus of claim 1, wherein the room access key comprising a QR code for display on a user interface and acceptance by an optical scanner near the door lock of the particular room.

4. The apparatus of claim 1, wherein, when querying the one or more databases of the hospitality establishment to determine whether the device identifier is associated with the new guest registered for the particular room, the one or more processors are configured to query a reservation database of the hospitality establishment to determine whether the device identifier corresponds to a registered device of an active reservation of the hospitality establishment.

5. The apparatus of claim 4, wherein a particular reservation of the hospitality establishment is defined as the active reservation when a start-time of the particular reservation has been reached and an end-time of the particular reservation has not yet been reached.

6. The apparatus of claim 4, wherein a particular reservation of the hospitality establishment is defined as the active reservation when a current time is within a first predetermined duration before a start-time of the particular reservation or when the current time is within a second predetermined duration after an end-time of the particular reservation.

7. The apparatus of claim 4, wherein the reservation database stores a plurality of guest reservations of the hospitality establishment and each of the guest reservations may include one or more registered devices.

8. The apparatus of claim 4, wherein the reservation database is a property management system (PMS) of the hospitality establishment.

9. The apparatus of claim 1, wherein, when querying the one or more databases of the hospitality establishment to determine whether the device identifier is associated with the new guest registered for the particular room, the one or more processors are configured to:
query a user profile database via an external network to find a particular user identifier that is associated with the device identifier, wherein the user profile database is remote from the hospitality establishment and stores associations between one or more device identifiers and one or more user identifiers; and
in response to finding the particular user identifier that is associated with the device identifier from the user profile database, query a guest database of the hospitality establishment to determine whether the particular user identifier is associated with a current guest of the hospitality establishment, wherein the guest database of the hospitality establishment stores user identifiers of currently registered guests for guest rooms of the hospitality establishment.

10. The apparatus of claim 1, wherein the one or more processors are further configured to activate Internet access for the user device at the hospitality establishment in response to determining that the device identifier is associated with the new guest registered for the particular room, thereby preventing the user device from needing to display a login portal before gaining Internet access from the computer network.

11. A method of automatic check-in at a hospitality establishment, the method comprising:
detecting a device identifier of a user device in network traffic transmitted on a computer network of the hospitality establishment;
searching a set of authorized user devices to determine whether the device identifier corresponds to any locally recognized user device at the hospitality establishment;
in response to determining that the device identifier corresponds to a locally recognized user device, taking no further action because a firewall at the hospitality establishment has already been configured with one or more device-specific rules for the locally recognized user device;
in response to determining that the device identifier does not correspond to any locally recognized user device at the hospitality establishment, querying one or more databases of the hospitality establishment to determine whether the device identifier is associated with a new guest registered for a particular room of the hospitality establishment; and
sending a room access key to the user device via the computer network and configuring the firewall with at least one rule allowing Internet access for the user device in response to determining that the device identifier is associated with the new guest registered for the particular room;
wherein the room access key allows the new guest registered for the particular room to open a door lock of the particular room.

12. The method of claim 11, further comprising generating the room access key to be different for each new guest registered for the particular room.

13. The method of claim 11, wherein the room access key comprises a QR code for display on a user interface and acceptance by an optical scanner near the door lock of the particular room.

14. The method of claim 11, wherein querying the one or more databases of the hospitality establishment to determine whether the device identifier is associated with the new guest registered for the particular room comprises querying a reservation database of the hospitality establishment to determine whether the device identifier corresponds to a registered device of an active reservation of the hospitality establishment.

15. The method of claim 14, wherein a particular reservation of the hospitality establishment is defined as the active reservation when a start-time of the particular reservation has been reached and an end-time of the particular reservation has not yet been reached.

16. The method of claim 14, wherein a particular reservation of the hospitality establishment is defined as the active reservation when a current time is within a first predetermined duration before a start-time of the particular reservation or when the current time is within a second predetermined duration after an end-time of the particular reservation.

17. The method of claim 14, wherein the reservation database stores a plurality of guest reservations of the hospitality establishment and each of the guest reservations may include one or more registered devices.

18. The method of claim 14, wherein the reservation database is a property management system (PMS) of the hospitality establishment.

19. The method of claim 11, wherein querying the one or more databases of the hospitality establishment to determine whether the device identifier is associated with the new guest registered for the particular room comprises:
querying a user profile database via an external network to find a particular user identifier that is associated with the device identifier, wherein the user profile database is remote from the hospitality establishment and stores associations between one or more device identifiers and one or more user identifiers; and
in response to finding the particular user identifier that is associated with the device identifier from the user profile database, querying a guest database of the hospitality establishment to determine whether the particular user identifier is associated with a current guest of the hospitality establishment, wherein the guest database of the hospitality establishment stores user identifiers of currently registered guests for guest rooms of the hospitality establishment.

20. A non-transitory processor-readable medium comprising a plurality of processor-executable instructions that when executed by one or more processors cause the one or more processors to perform steps of:
- detecting a device identifier of a user device in network traffic transmitted on a computer network of a hospitality establishment;
- searching a set of authorized user devices to determine whether the device identifier corresponds to any locally recognized user device at the hospitality establishment;
- in response to determining that the device identifier corresponds to a locally recognized user device, taking no further action because a firewall at the hospitality establishment has already been configured with one or more device-specific rules for the locally recognized user device;
- in response to determining that the device identifier does not correspond to any locally recognized user device at the hospitality establishment, querying one or more databases of the hospitality establishment to determine whether the device identifier is associated with a new guest registered for a particular room of the hospitality establishment; and
- sending a room access key to the user device via the computer network and configuring the firewall with at least one rule allowing Internet access for the user device in response to determining that the device identifier is associated with the new guest registered for the particular room;
- wherein the room access key allows the new guest registered for the particular room to open a door lock of the particular room.

* * * * *